United States Patent
Yokoyama

(10) Patent No.: US 10,572,198 B2
(45) Date of Patent: Feb. 25, 2020

(54) IMAGE FORMING APPARATUS, AND IMAGE FORMING APPARATUS CONTROL METHOD

(71) Applicant: CANON KABUSHIKI KAISHA, Tokyo (JP)

(72) Inventor: Junnosuke Yokoyama, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/419,912

(22) Filed: Jan. 30, 2017

(65) Prior Publication Data

US 2017/0142279 A1    May 18, 2017

Related U.S. Application Data

(63) Continuation of application No. 14/618,901, filed on Feb. 10, 2015.

(30) Foreign Application Priority Data

Feb. 13, 2014 (JP) ................. 2014-025168

(51) Int. Cl.
*G06F 3/12* (2006.01)
*G03G 15/00* (2006.01)
*H04N 1/00* (2006.01)

(52) U.S. Cl.
CPC ....... *G06F 3/1221* (2013.01); *G03G 15/5004* (2013.01); *G03G 15/80* (2013.01); *G06F 3/1229* (2013.01); *H04N 1/00323* (2013.01); *H04N 1/00814* (2013.01); *H04N 1/00891* (2013.01); *H04N 1/00896* (2013.01); *Y02D 10/1592* (2018.01)

(58) Field of Classification Search
None
See application file for complete search history.

(56) References Cited

U.S. PATENT DOCUMENTS 5,808,294 A * 9/1998 Neumann .......... G05B 19/0426
                                                    250/214 AL
5,822,077 A * 10/1998 Sasaki ................ H04N 1/00885
                                                    358/296

(Continued)

FOREIGN PATENT DOCUMENTS

CN        1812270 A        8/2006
CN      102854769 A  *    1/2013    ........ G03G 15/5004

(Continued)

*Primary Examiner* — Ted W Barnes
(74) *Attorney, Agent, or Firm* — Canon U.S.A., Inc. IP Division

(57) ABSTRACT

An image forming apparatus is operable at least in a first power state and in a second power state, in which electric power consumption in the second power state is less than electric power consumption in the first power state. The apparatus includes a detection unit formed by a plurality of elements disposed to detect the temperature of an object, and a control unit configured to control the image forming apparatus in such a way as to shift from the second power state to the first power state based on a detection result obtained by the detection unit at first timing and a detection result obtained by the detection unit at second timing.

19 Claims, 12 Drawing Sheets

TIMING WHEN HUMAN BODY HAS ENTERED DETECTION AREA

DISTANCE BETWEEN APPARATUS AND HUMAN BODY

DETECTION RESULT OBTAINED BY HUMAN PRESENCE SENSOR

27°C OR MORE: FOUR SPOTS

TIMING WHEN HUMAN BODY HAS REACHED WITHIN POWER RESTORATION DISTANCE

27°C OR MORE: 21 SPOTS

(56) References Cited

U.S. PATENT DOCUMENTS

| | | | | |
|---|---|---|---|---|
| 6,344,749 | B1* | 2/2002 | Williams | G01R 31/021 324/620 |
| 6,577,825 | B1* | 6/2003 | Gonnella, Jr. | G03G 15/5004 399/38 |
| 6,842,593 | B2* | 1/2005 | Cannon | G03G 15/5016 399/80 |
| 7,794,040 | B2* | 9/2010 | Snyder | B41J 29/393 347/19 |
| 7,844,193 | B2* | 11/2010 | Takagi | G06F 9/4401 399/38 |
| 8,254,800 | B2* | 8/2012 | Oyoshi | G03G 15/5004 399/79 |
| 10,095,449 | B2* | 10/2018 | Yokoyama | G06F 3/1221 |
| 2004/0073827 | A1* | 4/2004 | Tsirkel | G06F 1/3203 713/323 |
| 2005/0190707 | A1* | 9/2005 | Nishizawa | H04N 1/0035 370/286 |
| 2006/0066891 | A1* | 3/2006 | Ikeda | G06F 3/1222 358/1.15 |
| 2006/0171343 | A1* | 8/2006 | Maehara | G08C 17/00 370/311 |
| 2007/0013550 | A1* | 1/2007 | Xie | G06F 1/3203 340/901 |
| 2007/0295060 | A1* | 12/2007 | Delgado | G01M 3/187 73/49.3 |
| 2008/0170258 | A1* | 7/2008 | Yamamura | G06F 1/3203 358/1.15 |
| 2009/0148006 | A1* | 6/2009 | Hayasaki | G06K 9/00221 382/118 |
| 2009/0313493 | A1* | 12/2009 | Ide | G06F 1/3203 713/323 |
| 2009/0316178 | A1* | 12/2009 | Tanaka | G06F 21/81 358/1.14 |
| 2009/0316193 | A1* | 12/2009 | Kohara | G03G 15/5016 358/1.15 |
| 2010/0007801 | A1* | 1/2010 | Cooper | G06F 1/3203 348/730 |
| 2010/0150600 | A1* | 6/2010 | Oyoshi | G03G 15/5004 399/88 |
| 2010/0231390 | A1* | 9/2010 | Hashimoto | G03G 15/5004 340/573.1 |
| 2010/0250985 | A1* | 9/2010 | Gupta | G06F 1/3203 713/323 |
| 2010/0321711 | A1* | 12/2010 | Takahashi | G03G 15/5004 358/1.9 |
| 2011/0004776 | A1* | 1/2011 | Tanaka | H04N 1/00885 713/323 |
| 2011/0109937 | A1* | 5/2011 | Fujiki | H04N 1/00885 358/1.15 |
| 2011/0142519 | A1* | 6/2011 | Tsukuda | B41J 3/4075 400/76 |
| 2011/0228142 | A1* | 9/2011 | Brueckner | H04N 5/3572 348/241 |
| 2011/0255010 | A1* | 10/2011 | Sakai | H04N 5/4401 348/730 |
| 2011/0320842 | A1* | 12/2011 | Narushima | G03G 15/5004 713/323 |
| 2012/0127518 | A1* | 5/2012 | Ogata | G06F 1/3231 358/1.15 |
| 2012/0127538 | A1* | 5/2012 | Mamiya | G06F 1/3231 358/442 |
| 2012/0137154 | A1* | 5/2012 | Azuma | G03G 15/5004 713/323 |
| 2012/0146803 | A1* | 6/2012 | Gear | G06F 1/3231 340/686.6 |
| 2012/0327458 | A1* | 12/2012 | Baba | G03G 15/5004 358/1.15 |
| 2012/0328319 | A1* | 12/2012 | Ogata | G03G 15/5016 399/75 |
| 2013/0010335 | A1* | 1/2013 | Baba | G03G 15/5004 358/3.01 |
| 2013/0057894 | A1* | 3/2013 | Narushima | G03G 15/5004 358/1.14 |
| 2013/0073887 | A1* | 3/2013 | Miki | G06F 1/3231 713/323 |
| 2013/0083344 | A1* | 4/2013 | Funakawa | H04N 1/00127 358/1.13 |
| 2013/0205153 | A1* | 8/2013 | Yokoyanna | G06F 1/3275 713/323 |
| 2013/0219198 | A1* | 8/2013 | Kuroishi | H04N 1/00896 713/310 |
| 2013/0250372 | A1* | 9/2013 | Ogata | H04N 1/00323 358/442 |
| 2013/0258424 | A1* | 10/2013 | Ono | H04N 1/00323 358/475 |
| 2014/0075230 | A1* | 3/2014 | Suggs | H02J 7/35 713/323 |
| 2014/0153020 | A1* | 6/2014 | Tachikawa | H04N 1/00336 358/1.13 |
| 2014/0157032 | A1* | 6/2014 | Yokoyanna | G06F 1/3215 713/323 |
| 2014/0173315 | A1* | 6/2014 | Yokoyanna | G06F 1/3231 713/323 |
| 2014/0253938 | A1* | 9/2014 | Aoyagi | H04N 1/00323 358/1.13 |
| 2014/0300917 | A1* | 10/2014 | Ito | G03G 15/5004 358/1.14 |
| 2014/0334601 | A1* | 11/2014 | Shizukuishi | H01L 27/14661 378/62 |
| 2015/0006927 | A1* | 1/2015 | Ono | G06F 1/3231 713/320 |
| 2015/0234474 | A1* | 8/2015 | Yokoyanna | G06F 1/26 713/323 |
| 2015/0248156 | A1* | 9/2015 | Haraguchi | G03G 15/5016 713/323 |
| 2015/0253719 | A1* | 9/2015 | Matsumoto | G03G 15/80 399/75 |
| 2015/0261159 | A1* | 9/2015 | Horishita | G03G 15/5004 399/88 |
| 2015/0261168 | A1* | 9/2015 | Yokoyanna | G03G 15/80 399/81 |
| 2015/0278665 | A1* | 10/2015 | Imamura | G06K 15/4055 358/1.14 |
| 2015/0318327 | A1* | 11/2015 | Zheng | H01L 21/76898 438/70 |
| 2016/0373601 | A1* | 12/2016 | Kuroishi | H04N 1/00891 |

FOREIGN PATENT DOCUMENTS

| | | | |
|---|---|---|---|
| CN | 102854769 | A | 1/2013 |
| JP | 04081774 | A * | 3/1992 |
| JP | H04-081774 | A | 3/1992 |
| JP | 2012177796 | A * | 9/2012 |
| JP | 5045830 | B2 * | 10/2012 |
| JP | 5045830 | B2 | 10/2012 |
| JP | 2013-020048 | A | 1/2013 |
| JP | 2013020048 | A * | 1/2013 |
| JP | 2013020048 | A * | 1/2013 |
| JP | 2013-024761 | A | 2/2013 |

* cited by examiner

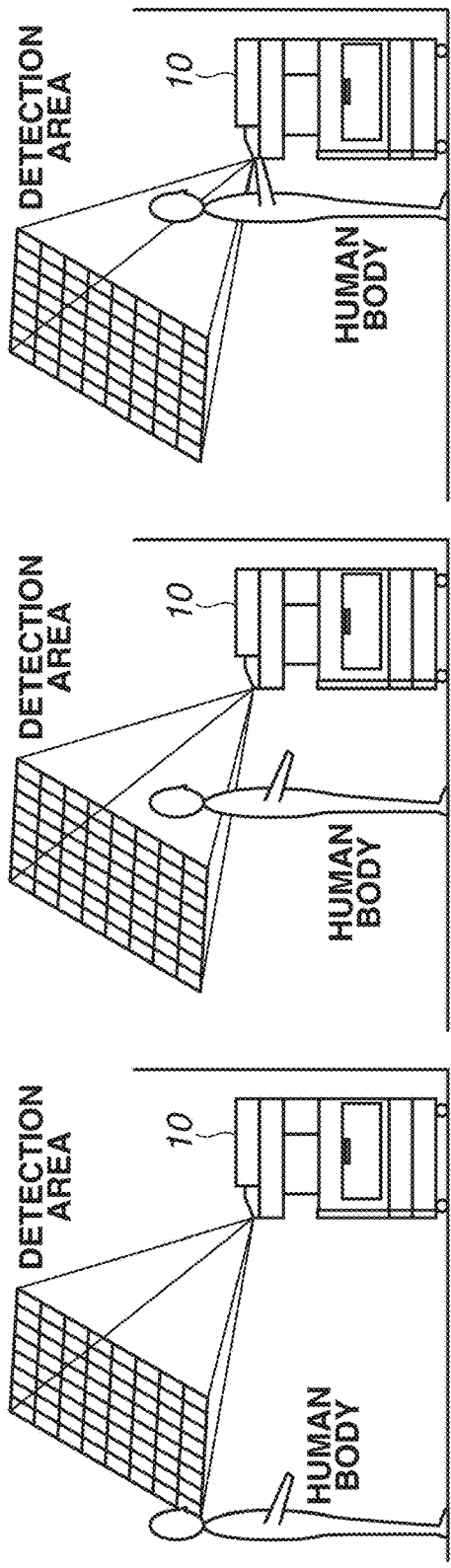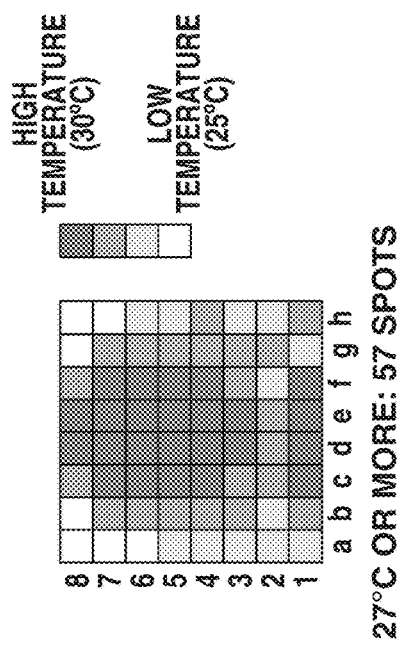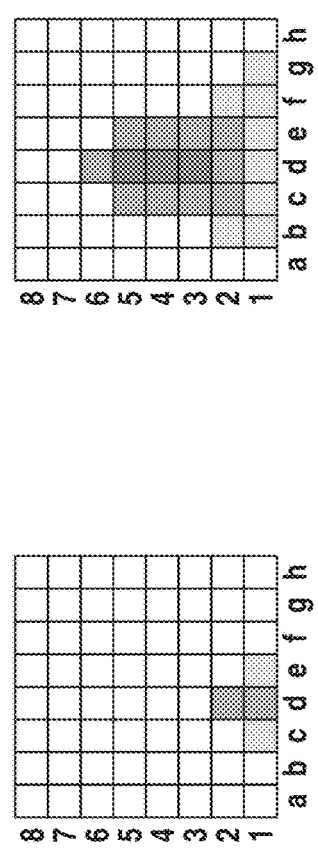
FIG. 7A
FIG. 7B
FIG. 7C

CEILING LIGHT OFF STATE
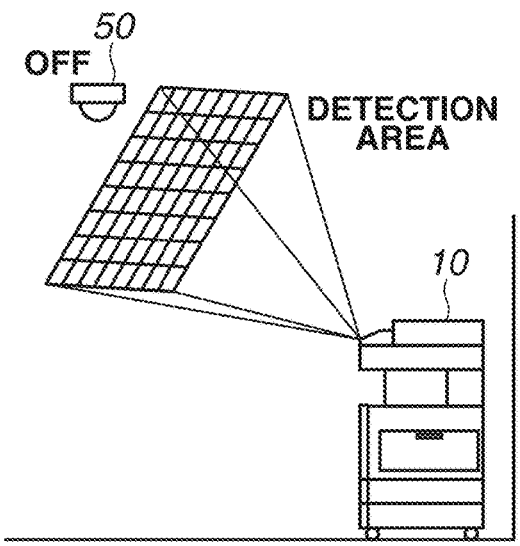
CEILING LIGHT ON STATE
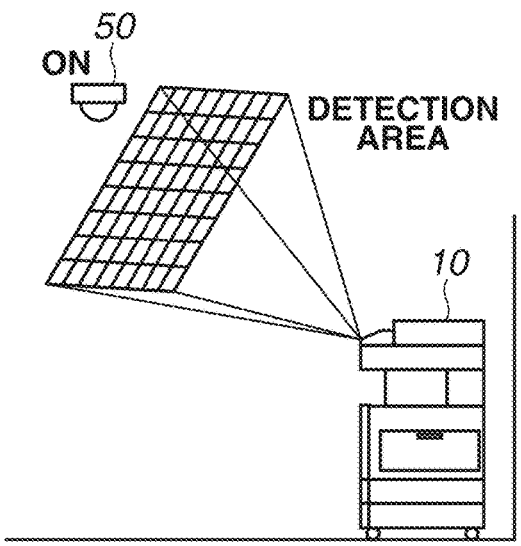
DETECTION RESULT OBTAINED
BY HUMAN PRESENCE SENSOR
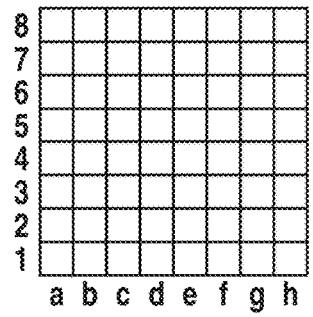
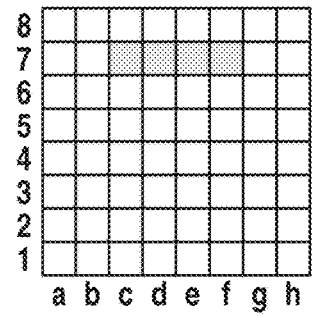
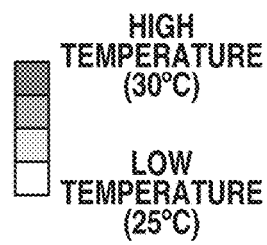
FIG. 8A
FIG. 8B

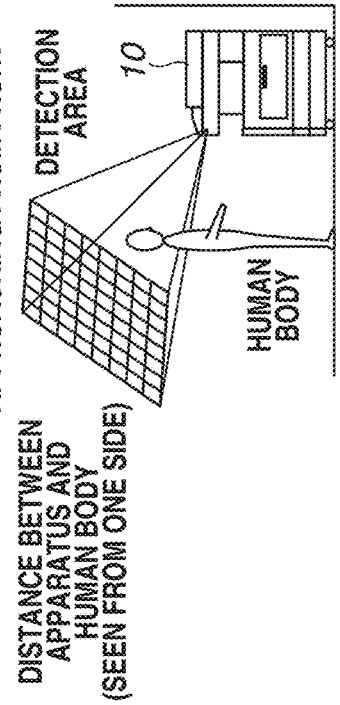
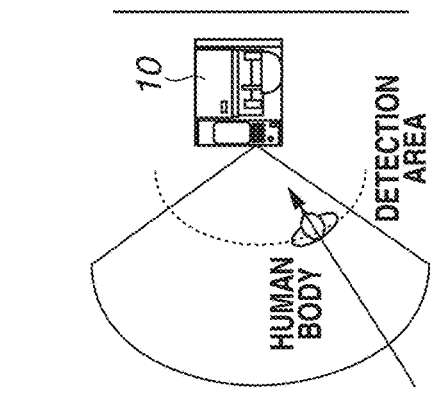
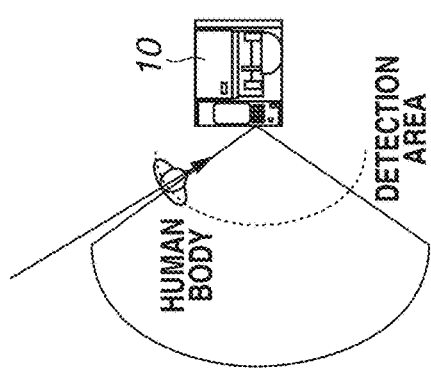
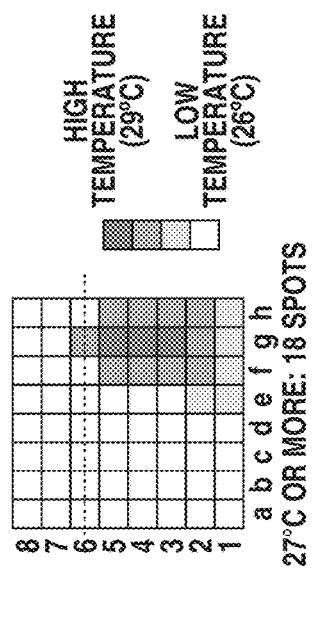
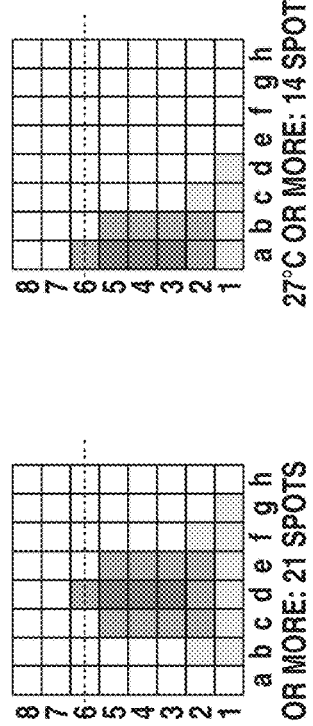
FIG. 10A  FIG. 10B  FIG. 10C

IMAGE FORMING APPARATUS, AND IMAGE FORMING APPARATUS CONTROL METHOD

CROSS-REFERENCE TO RELATED APPLICATION

This application is a Continuation of U.S. application Ser. No. 14/618,901, filed Feb. 10, 2015, which claims priority from Japanese Patent Application No. 2014-025168 filed Feb. 13, 2014, which are hereby incorporated by reference herein in their entireties.

BACKGROUND OF THE INVENTION

Field of the Invention

One disclosed aspect of the embodiments relates to an electric power control for an image forming apparatus equipped with a human presence sensor.

Description of the Related Art

An image forming apparatus discussed in Japanese Patent No. 05045830 is equipped with two human presence sensors, which are characteristically different from each other and cooperatively used to cancel a power saving mode. More specifically, the above-mentioned apparatus initially detects a movement of an approaching person with a thermoelectric type human presence sensor and secondarily detects an arrival of the person at a front side of the apparatus with a reflection type sensor human presence sensor. Subsequently, the apparatus determines that the detected person is a user who stops at and intends to operate the apparatus if the thermoelectric type human presence sensor does not detect any noticeable movement of the person in a state where the reflection type sensor continuously detects the presence of the person standing in front of the apparatus.

However, the above-mentioned conventional image forming apparatus is not desired in that product costs can be increased because of installation of two characteristically different human presence sensors. In addition, it is difficult to reduce electric power consumption in a power saving state. Further, the reflection-type human presence sensor is disadvantageous in that the detection distance is short and cannot restore the apparatus unless a user stands in front of the apparatus body. Therefore, every user is required to stay for a while without leaving from the apparatus until the apparatus starts an ordinary operation. In this respect, it is required to improve user friendliness.

SUMMARY OF THE INVENTION

In view of the foregoing, an embodiment intends to realize an image forming apparatus capable of accurately identifying a user approaching an apparatus and causing the apparatus to return from the power saving state at appropriate timing.

According to an aspect of an embodiment, an image forming apparatus is operable at least in a first power state and in a second power state, in which electric power consumption in the second power state is less than electric power consumption in the first power state. The image forming apparatus includes a detection unit formed by a plurality of elements disposed to detect heat emitted from an object, and a control unit configured to control the image forming apparatus in such a way as to shift from the second power state to the first power state based on a detection result obtained by the detection unit at first timing and a detection result obtained by the detection unit at second timing.

Further features of the disclosure will become apparent from the following description of exemplary embodiments with reference to the attached drawings.

BRIEF DESCRIPTION OF THE DRAWINGS

FIGS. 7A, 7B, and 7C illustrate differences between detection results obtained by the human presence sensor, which reflect the position of a human body in relation to the image forming apparatus.

FIGS. 8A and 8B illustrate differences between detection results obtained by the human presence sensor, in a case where an overhead light is located above the image forming apparatus.

FIGS. 10A, 10B, and 10C illustrate differences between detection results obtained by the human presence sensor, which reflect the position of a human body in relation to the image forming apparatus.

DESCRIPTION OF THE EMBODIMENTS

Figure 1:
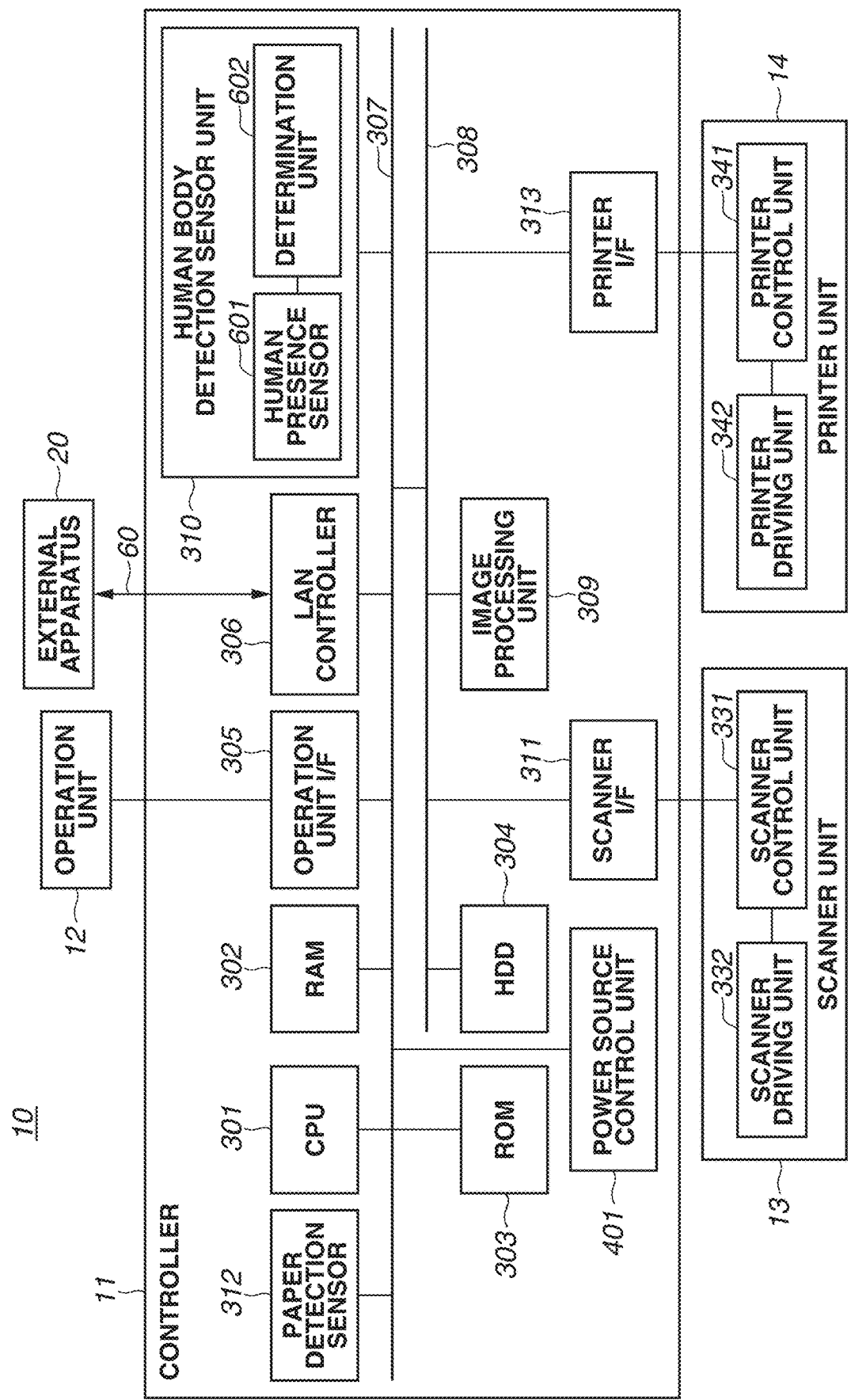
FIG. 1 illustrates a configuration example of an image forming apparatus according to an exemplary embodiment.

A first exemplary embodiment is described in detail below. FIG. 1 is a block diagram illustrating a configuration example of an image forming apparatus according to an exemplary embodiment. As illustrated in FIG. 1, the image forming apparatus 10 includes a controller 11, a scanner unit 13, a printer unit 14, an operation unit 12, and a power source unit 40 that is described in detail below with reference to FIG. 2.

The image forming apparatus 10 according to the present exemplary embodiment has at least two power supply modes, i.e., an ordinary operation power mode and a power saving mode. In the ordinary operation power mode (i.e., in an ordinary operation power state), the image forming apparatus 10 can perform ordinary operations including a copy operation. In the power saving mode (i.e., in a power saving state), the image forming apparatus 10 is operable with electric power consumption less than that in the ordinary operation power mode. If a predetermined time has elapsed before the usage of the image forming apparatus 10 starts, the controller 11 causes the apparatus to shift the power supply mode from the ordinary operation power mode to the power saving mode. In the power saving mode, the image forming apparatus 10 stops supplying electric power to the scanner unit 13 and the printer unit 14 as well as to a part of the controller 11 and unnecessary portions of the operation unit 12, as described in detail below.

<Description of the Controller 11>

The controller 11 controls various operations to be performed by the image forming apparatus 10, as described in detail below. As illustrated in FIG. 1, the controller 11 is electrically connected to the scanner unit 13, the printer unit 14, and the operation unit 12.

The controller 11 includes a central processing unit (CPU) 301, a random access memory (RAM) 302, a read only memory (ROM) 303, an operation unit I/F 305, a local area network (LAN) controller 306, a human body detection sensor unit 310, a paper detection sensor 312, and a power source control unit 401. The CPU 301, the RAM 302, the ROM 303, the operation unit I/F 305, the LAN controller 306, the human body detection sensor unit 310, the paper detection sensor 312, and the power source control unit 401 are connected to each other via a system bus 307.

Further, the controller 11 includes a hard disk drive (HDD) 304, an image processing unit 309, a scanner I/F 311, and a printer I/F 313. The HDD 304, the image processing unit 309, the scanner I/F 311, and the printer I/F 313 are connected to an image bus 308.

The CPU 301 can integrally control accesses to various devices being presently connected based on, for example, a control program stored in the ROM 303 and can integrally control various processing to be performed by the controller 11. The RAM 302 is a system work memory that enables the CPU 301 to perform various operations. The RAM 302 is also operable as a memory capable of temporarily storing image data. The RAM 302 includes a static random access memory (SRAM) and a dynamic random access memory (DRAM). In the power off state, the SRAM holds stored contents and the DRAM deletes stored contents. The ROM 303 stores a boot program for the apparatus. The HDD 304 stores system software applications and image data.

The operation unit I/F 305 is an interface unit that connects the system bus 307 to the operation unit 12. The operation unit I/F 305 can receive image data (i.e., data to be displayed on the operation unit 12) via the system bus 307 and output the image data to the operation unit 12. Further, the operation unit I/F 305 can receive information from the operation unit 12 and output the information to the system bus 307. The LAN controller 306 can control input/output of information between the image forming apparatus 10 and an external apparatus 20 connected to a network 60.

The paper detection sensor 312 can detect the presence of a paper being set on a manual tray. The power source control unit 401 can control electric power to be supplied to each portion of the image forming apparatus 10. The power source control unit 401 will be described in detail below. The image bus 308 is a transmission path dedicated to transmit and receive image data. For example, the image bus 308 can be formed by a Peripheral Components Interconnect (PCI) bus or an Institute of Electrical and Electronic Engineers (IEEE) 1394. The image processing unit 309 can perform image processing. More specifically, the image processing unit 309 reads image data stored in the RAM 302 and performs JPEG or JBIG image processing (including enlargement, reduction, and color adjustment) on the read image data.

<Description of the Human Body Detection Sensor Unit 310>

The human body detection sensor unit 310 includes a human presence sensor 601 and a determination unit 602. Electric power can be supplied to the human body detection sensor unit 310 from a first power supply unit 410 (see FIG. 2) even in the power saving mode. Although electric power can be constantly supplied to the human presence sensor 601, supplying electric power to the determination unit 602 can be appropriately stopped. The determination unit 602 is, however, immediately supplied with electric power when the human presence sensor 601 detects a predetermined reaction.

The human presence sensor 601 is an infrared ray sensor array composed of a plurality of infrared light-receiving elements disposed in a matrix pattern to receive infrared rays. If the human presence sensor 601 receives infrared rays emitted from a human body, the determination unit 602 determines that there is a person who has approached the image forming apparatus 10. In the present exemplary embodiment, the human presence sensor 601 can detect a human body. However, the human presence sensor 601 can detect any other object that can emit infrared rays. The human presence sensor 601 is not limited to the above-mentioned infrared ray sensor. The human presence sensor 601 can be any other sensor as long as it can detect an object having approached the image forming apparatus 10. For example, an optical sensor capable of detecting light, a strain sensor causing a deformation in response to a physical force, a magnetic sensor capable of detecting a magnetic force, and a temperature sensor capable of detecting temperature are prospective devices employable as the human presence sensor 601.

The determination unit 602 can determine the presence of a user by processing a detection result of the human presence sensor 601. For example, the determination unit 602 calculates the temperature of an object based on temperature data output from each infrared light-receiving element of the human presence sensor 601. The determination unit 602 outputs a power supply request signal (i.e., signal Q illustrated in FIG. 2) to the power source control unit 401 with reference to a determination result. If the power source control unit 401 receives the power supply request signal Q, the power source control unit 401 returns the power supply mode of the image forming apparatus 10 to the ordinary operation power mode. The determination unit 602 can perform determination processing as described in detail below.

The scanner unit 13 is a device configured to read an image formed on an original document and acquire image data. The scanner unit 13 includes a charge coupled device (CCD) that receives reflected light when the image formed on the original document is irradiated with light and converts information about the image into an electric signal. The electric signal is then converted into a luminance signal composed of R, G, and B colors and output to the controller 11. The scanner unit 13 includes a scanner control unit 331 and a scanner driving unit 332. The scanner driving unit 332 is a physical driving device including a paper conveyance motor, which can convey each original document being set on the tray to a reading position of the scanner unit 13. The scanner control unit 331 can control operations to be performed by the scanner driving unit 332. The scanner control unit 331 communicates with the CPU 301 to receive setting information having being set by a user when the scanner unit 13 performs scanning processing. The scanner control unit 331 can control the operations to be performed by the scanner driving unit 332 based on the setting information.

The printer unit 14 is a device configured to form an image on a paper based on input image data. The printer unit 14 includes a printer control unit 341 and a printer driving unit 342. The printer driving unit 342 is a physical driving device that includes a photosensitive drum rotating motor, a fixing device rotating motor, and the paper conveyance motor. The printer control unit 341 can control operations to be performed by the printer driving unit 342. The printer control unit 341 communicates with the CPU 301 to receive setting information having been set by a user when the image forming apparatus 10 performs print processing. The printer control unit 341 can control operations to be performed by the printer driving unit 342 based on the setting information. The image forming method of the printer unit 14 is not limited to an electro-photographic method characterized by the usage of a photoconductive drum and a photoconductive belt. For example, the image forming method of the printer unit 14 can be an inkjet method characterized by the usage of an array of small nozzles configured to form an image on a paper with ink droplets discharged from respective nozzles or can be any other print method.

<Description of Power Source Circuit Configuration of the Image Forming Apparatus>

Figure 2:
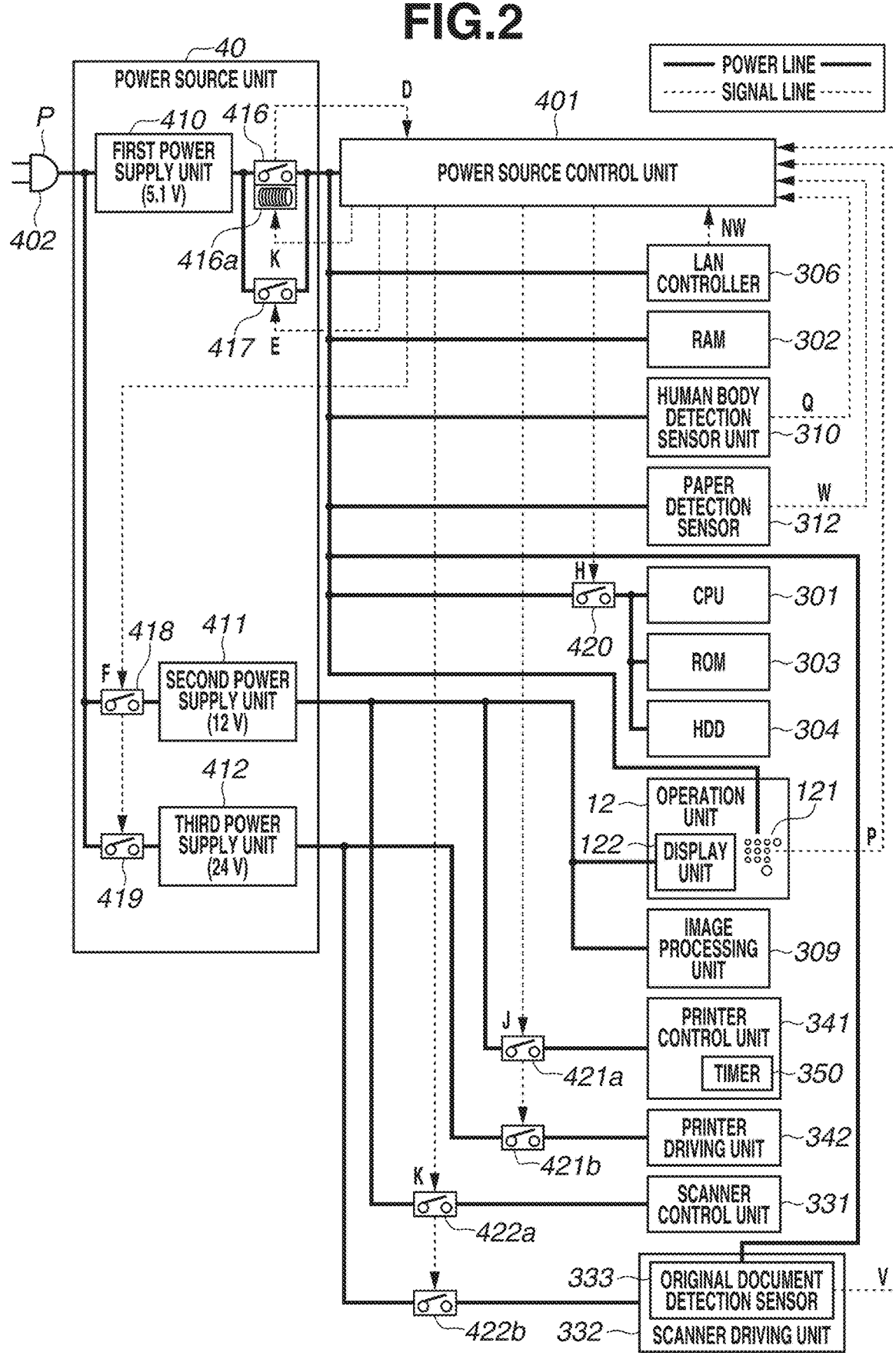
FIG. 2 illustrates a configuration example of a power source circuit of the image forming apparatus.

FIG. 2 illustrates a configuration example of a power source circuit of the image forming apparatus 10. Electric power generated by the power source unit 40 can be supplied to each above-mentioned portion of the image forming apparatus 10. The power source unit 40 includes a second power supply unit 411 and a third power supply unit 412 in addition to the above-mentioned first power supply unit 410. AC power can be supplied to the power source unit 40 via a power source plug 402 from a public power source.

The first power supply unit 410 can convert the AC power supplied via the power source plug 402 into first output DC power (e.g., 5.1 V). The first output DC power can be supplied to first power source system devices (including the power source control unit 401, the CPU 301, the RAM 302, the ROM 303, the HDD 304, the LAN controller 306, the human body detection sensor unit 310, the paper detection sensor 312, and a button 121 of the operation unit 12). In the present exemplary embodiment, the CPU 301 is operable without receiving any electric power supplied from the second power supply unit 411 and the third power supply unit 412, when electric power can be supplied from the first power supply unit 410. In other words, the power source of the CPU 301 is independent of the second power supply unit 411 and the third power supply unit 412.

The second power supply unit 411 can convert the AC power supplied via the power source plug 402 into second output DC power (e.g., 12V). The second output DC power can be supplied to second power source system devices (including a display unit 122 of the operation unit 12, the image processing unit 309, the printer control unit 341 of the printer unit 14, and the scanner control unit 331 of the scanner unit 13).

Further, the third power supply unit 412 can convert the AC power supplied via the power source plug 402 into third output DC power (e.g., 24V). The third output DC power can be supplied to third power source system devices (including the printer driving unit 342 and the scanner driving unit 332).

Further, a power switch 416 that selectively takes ON state or OFF state according to a user operation is provided between the first power supply unit 410 and the first power source system devices. A signal D indicating an operational state (ON state or OFF state) of the power switch 416 can be input from the power switch 416 to the power source control unit 401. Further, a switch 417 that is disposed in parallel with the power switch 416 and formed by an electric field effect transistor (FET) is provided between the first power supply unit 410 and the first power source system devices. The switch 417 can be switched from ON state to OFF state or from OFF state to ON state according to a control signal E output from the power source control unit 401. The power switch 416 includes a solenoid 416a, which can bring the power switch 416 into OFF state when a voltage is applied to the solenoid 416a according to a control signal K output from the power source control unit 401.

When the image forming apparatus 10 performs an auto shutdown function or a remote shutdown function, the power source control unit 401 outputs the control signal K to drive the solenoid 416a in such a way as to turn off the power switch 416. The auto shutdown function allows the image forming apparatus 10 to perform a shutdown operation automatically when a predetermined time has elapsed in a state where there is not any user operation. The remote shutdown function allows the image forming apparatus 10 to perform a shutdown operation according to a shutdown instruction transmitted from the external apparatus 20.

A relay switch 418 is provided between the power source plug 402 and the second power supply unit 411. Further, a relay switch 419 is provided between the power source plug 402 and the third power supply unit 412. Each of the relay switches 418 and 419 can be switched from ON state to OFF state or from OFF state to ON state according to a control signal F output from the power source control unit 401.

A switch 420 is provided between the power switch 416 and each of the CPU 301, the ROM 303, and the HDD 304. The switch 420 can be switched from ON state to OFF state or from OFF state to ON state according to a control signal H output from the power source control unit 401.

A switch 421a is provided between the second power supply unit 411 and the printer control unit 341. Further, a switch 421b is provided between the third power supply unit 412 and the printer driving unit 342. Each of the switches 421a and 421b can be switched from ON state to OFF state or from OFF state to ON state according to a control signal J output from the power source control unit 401. Electric power can be supplied to a timer 350 provided in the printer control unit 341 from a battery (not illustrated). Therefore, the timer 350 is operable even in a state where no electric power can be supplied to the printer control unit 341.

A switch 422a is provided between the second power supply unit 411 and the scanner control unit 331. Further, a switch 422b is provided between the third power supply unit 412 and the scanner driving unit 332. Each of the switches 422a and 422b can be switched from ON state to OFF state or from OFF state to ON state according to the control signal K output from the power source control unit 401.

Figure 3:
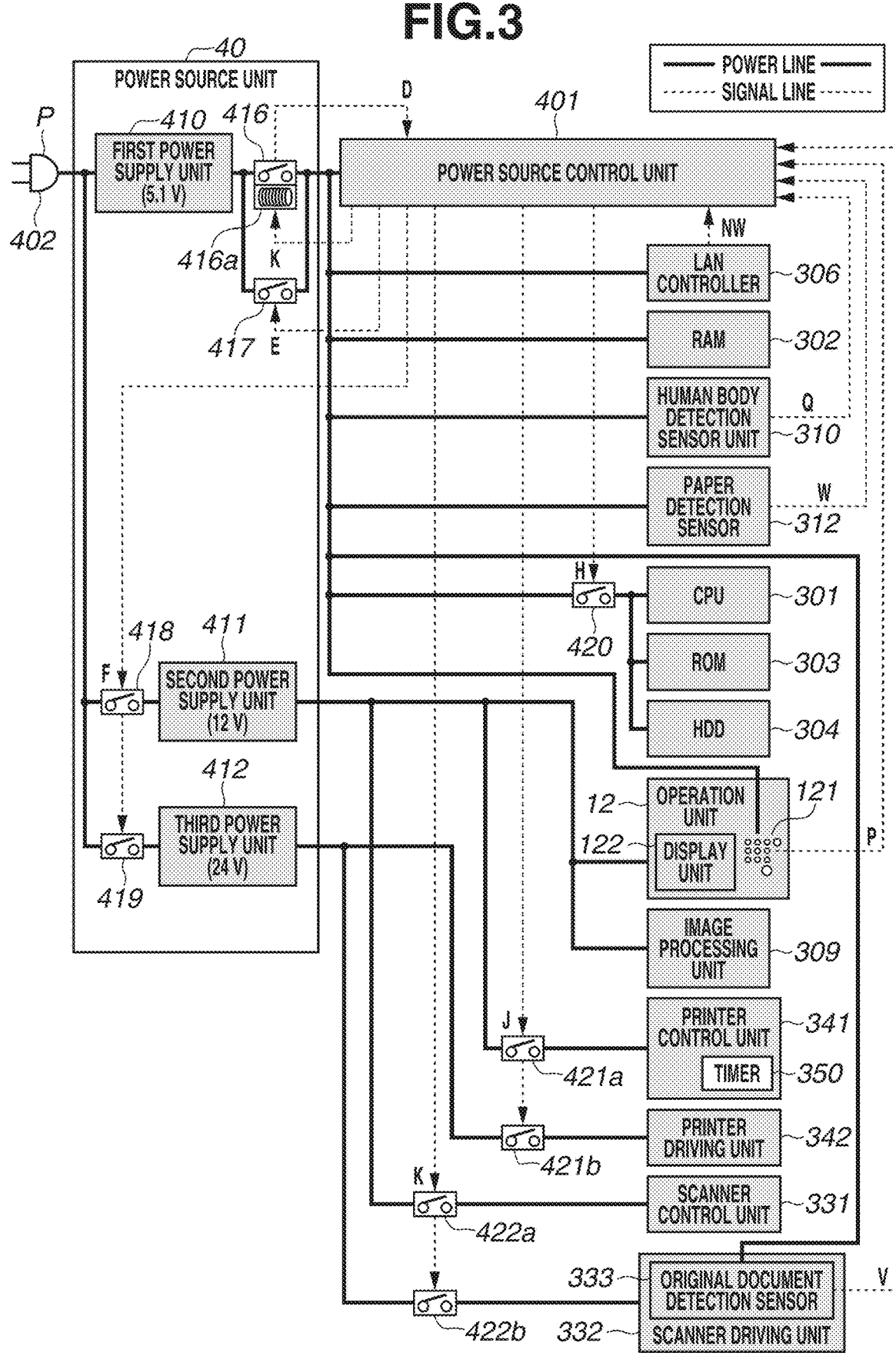
FIG. 3 illustrates a power state of the image forming apparatus.
Figure 4:
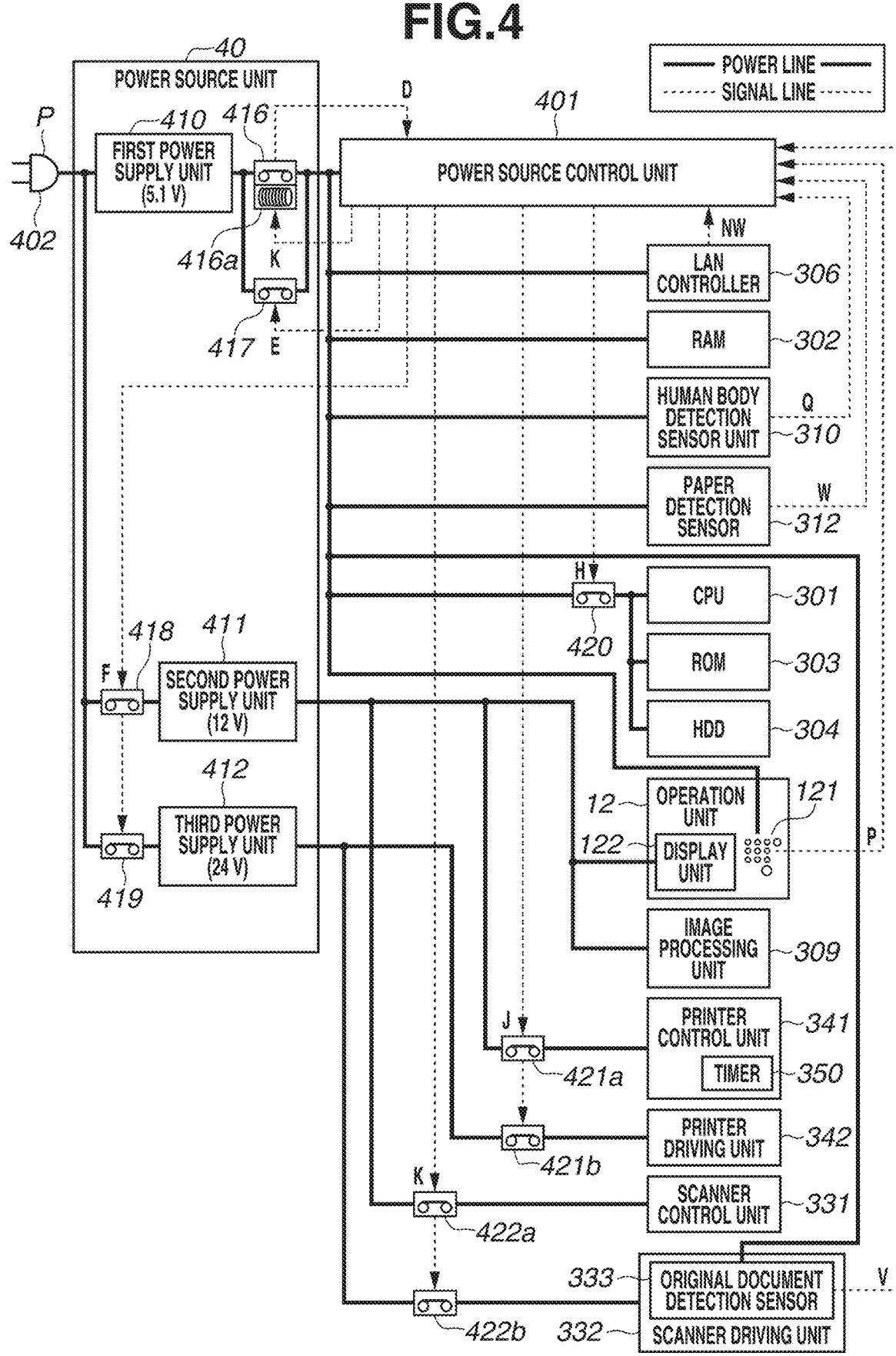
FIG. 4 illustrates a power state of the image forming apparatus.
Figure 5:
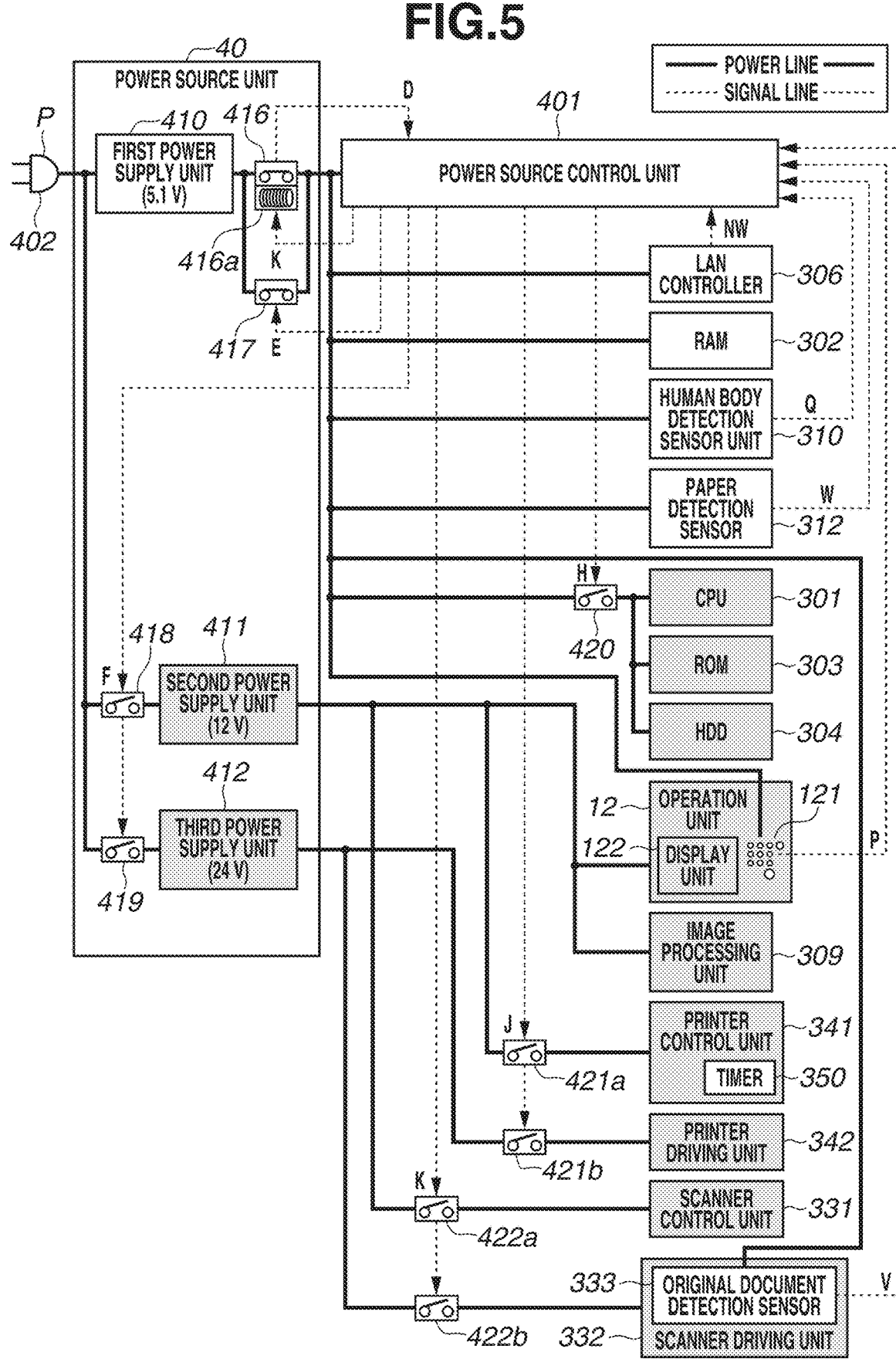
FIG. 5 illustrates a power state of the image forming apparatus.

Hereinafter, examples of the power state of the image forming apparatus 10 will be described in detail below with reference to FIGS. 3 to 5. Each of FIGS. 3 to 5 illustrates an example of the power state of the image forming apparatus 10. In FIGS. 3 to 5, each shaded portion indicates a portion to which no electric power can be supplied.

(1) Power Off State

FIG. 3 illustrates a power off state, in which no electric power can be supplied to each portion of the image forming apparatus 10. In the power off state, each of the switches 416 to 422 is brought into an OFF state. The power off state can be a hibernation state.

(2) Ordinary Operation Power Mode

FIG. 4 illustrates an ordinary operation power mode, in which electric power can be supplied to each of the controller 11, the operation unit 12, the printer unit 14, and the scanner unit 13. More specifically, in the ordinary operation power mode, each of the switches 416 to 422 is brought into an ON state.

(3) Power Saving Mode

FIG. 5 illustrates a power saving mode, in which electric power can be supplied to the power source control unit 401, the RAM 302, the LAN controller 306, the human body detection sensor unit 310, the paper detection sensor 312, an original document detection sensor 333, and the button 121 of the operation unit 12. Further, in the power saving mode, no electric power can be supplied to the CPU 301, the ROM 303, the HDD 304, the image processing unit 309, the scanner unit 13, and the printer unit 14. In the power saving mode, electric power can be supplied from the first power supply unit 410 to the first power source system devices (including the power source control unit 401, the RAM 302, the LAN controller 306, the human body detection sensor unit 310, the paper detection sensor 312, the original document detection sensor 333, and the button 121). In the power saving mode, as illustrated in FIG. 5, each of the switches 416 and 417 is brought into an ON state and each of other switches 418 to 422 is brought into an OFF state. In the power saving mode, each user operation via the button 121 of the operation unit 12 can be accepted. Further, in the power saving mode, the LAN controller 306 can receive packets transmitted from the external apparatus 20. Further, in the power saving mode, the human body detection sensor unit 310 can detect a human body having approached the image forming apparatus 10. Further, in the power saving mode, the paper detection sensor 312 can detect a paper placed on the manual tray. Further, in the power saving mode, the original document detection sensor 333 can detect an original document being set on a tray.

The image forming apparatus 10 can be configured to operate in any other power supply mode. For example, the image forming apparatus 10 can be configured to shift from the power saving mode to a response mode (not illustrated) if the LAN controller 306 receives a packet (excluding a PDL job) to which the LAN controller 306 cannot independently respond in the above-mentioned power saving mode. In the response mode, the switch 420 is brought into an ON state from the above-mentioned power saving mode and electric power can be supplied from the first power supply unit 410 to the CPU 301, the ROM 303, and the HDD 304. In the response mode, the CPU 301 can transmit a reply responding to the received packet to which the LAN controller 306 cannot independently respond with reference to information stored in the HDD 304. The image forming apparatus 10 shifts into the power saving mode after the image forming apparatus 10 completes processing on the above-mentioned packet in the response mode.

Further, the image forming apparatus 10 can be configured to shift into an adjustment mode (not illustrated) when the timer 350 provided in the printer control unit 341 counts a predetermined time in the power saving mode. The adjustment mode is provided to prevent the photosensitive drum from contacting for a long time a blade that scrapes toner particles adhering to the photosensitive drum, at the same position. The photosensitive drum starts rotating a predetermined amount when the image forming apparatus 10 shifts into the adjustment mode, in such a way as to change the relative position between the photosensitive drum and the blade. In the adjustment mode, no electric power can be supplied to the CPU 301 and the HDD 304 and electric power can be supplied to the printer control unit 341 and the printer driving unit 342. In the adjustment state, each of the switches 416, 417, 418, 419, and 421 is brought into an ON state and each of the switches 420 and 422 is brought into an OFF state. The image forming apparatus 10 shifts into the power saving mode again after the image forming apparatus 10 completes a specific operation (e.g., the above-mentioned operation for rotating the photosensitive drum) in the adjustment mode.

Next, the power source control unit 401 will be described in detail. The power source control unit 401 is, for example, a complex programmable logic device (CPLD). The power source control unit 401 can control the image forming apparatus 10 such that the image forming apparatus 10 shifts into each of the above-mentioned power states. Electric power is constantly supplied to the power source control unit 401 in the power saving mode. The power source control unit 401 can detect a plurality of types of restoration factors that return the image forming apparatus 10 from the power saving mode.

For example, the power source control unit 401 receives a signal NW, as one of the restoration factors, from the LAN controller 306. The signal NW is a signal to be output to the power source control unit 401 when the LAN controller 306 receives a page description language (PDL) job.

Further, the power source control unit 401 receives a signal P, as one of the restoration factors, from the button 121 of the operation unit 12. The signal P is a signal to be output to the power source control unit 401 when the button 121 is operated by a user. Further, the power source control unit 401 receives the signal Q, as one of the restoration factors, from the human body detection sensor unit 310. The signal Q is a signal to be output to the power source control unit 401 when the human body detection sensor unit 310 detects a person who is approaching the image forming apparatus 10.

Further, the power source control unit 401 receives a signal V, as one of the restoration factors, from the original document detection sensor 333. The signal V is a signal to be output to the power source control unit 401 when the original document detection sensor 333 detects an original document. Further, the power source control unit 401 receives a signal W, as one of the restoration factors, from the paper detection sensor 312 provided in the manual tray. The signal W is a signal to be output to the power source control unit 401 when a paper is placed on the manual tray.

The power source control unit 401 brings each operational state of respective switches 417 to 422 into ON state or OFF state based on the logic of the above-mentioned restoration factors (i.e., the signals NW, P, Q, V, and W). The power source control unit 401 is functionally operable as a signal output unit. More specifically, when the signal NW is input to the power source control unit 401, the power source control unit 401 generates the control signals E, F, K, J, and H (turns the signal level to "Hi"). Therefore, the image forming apparatus 10 shifts into the ordinary operation power mode. Similarly, when the signal P, the signal Q, the signal V or the signal W is input to the power source control unit 401, the power source control unit 401 generates the control signals E, F, K, J, and H (turns the signal level to "Hi"). Therefore, the image forming apparatus 10 shifts into the ordinary operation power mode.

Further, the power source control unit 401 receives the signal D representing the operational state of the power switch 416. The signal D is a signal to be output to the power source control unit 401 when the power switch 416 is brought into an OFF state by a user operation. When the signal D is input to the power source control unit 401, the power source control unit 401 generates the control signals E, F, H, J, and K (turns the signal level to "Hi"). Therefore, the image forming apparatus 10 shifts into the power off state.

Figure 6:
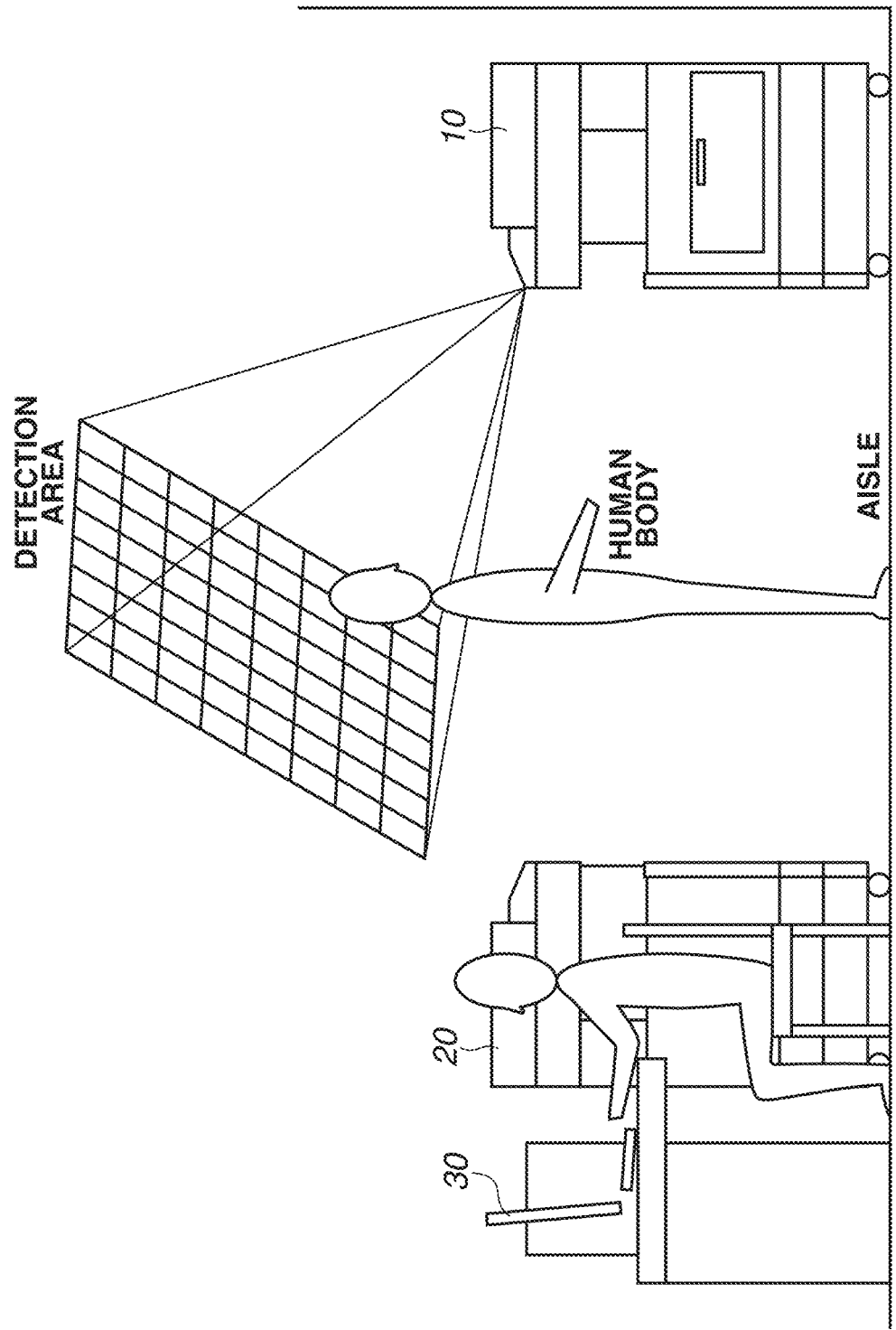
FIG. 6 illustrates an example of a detection area of a human presence sensor.

Hereinafter, a human body detection operation that can be performed by the human body detection sensor unit 310 is described in detail below with reference to FIG. 6. FIG. 6 illustrates an example of a detection area of the human presence sensor 601 provided in the human body detection sensor unit 310.

The human presence sensor 601 according to the present exemplary embodiment is an infrared ray array sensor, which is composed of a plurality of infrared light-receiving elements (i.e., infrared ray sensors), for example, disposed in an M×N matrix pattern, in which M and N are natural numbers and can take the same value. The layout of the plurality of infrared light-receiving elements constituting the human presence sensor 601 is not limited to the M×N matrix pattern.

The human presence sensor 601 (i.e., the infrared ray array sensor) is characterized by receiving infrared rays emitted from a heat source (e.g., a human body) with the plurality of infrared light-receiving elements (i.e., infrared ray sensors) disposed in the matrix pattern and identifying the shape of the heat source (i.e., the detected area) as a temperature distribution based on temperature values measured with reference to light-receiving results at respective infrared light-receiving elements. The human presence sensor 601 can detect an object in a space existing in radial directions from a detection surface (i.e., a surface on which the infrared light-receiving elements are disposed) as illustrated in FIG. 6. Using the above-mentioned characteristic features of the human presence sensor 601, the image forming apparatus 10 detects the temperature of the heat source approaching the image forming apparatus 10 and determines whether the heat source is a human body with reference to the identified shape and measured temperature values. Detecting a naked skin is useful to surely measure human body temperatures. Therefore, the human presence sensor 601 is set on the image forming apparatus 10 in such a manner that the detection area of the human presence sensor 601 faces a front surface direction (i.e., the left direction in FIG. 6) and an upper position higher than the main body of the image forming apparatus 10, so that the temperature of a human face can be measured. More specifically, the detection surface of the human presence sensor 601 is directed obliquely upward from the front surface of the image forming apparatus 10. Directing the sensor obliquely upward from the front surface direction is useful in that detecting the heat of any other object (e.g., a person sitting on a chair, a PC/monitor set 30 placed on a desk, or the external apparatus 20) positioned on the front surface side of the image forming apparatus 10 can be prevented.

The human presence sensor 601 can output an interrupt signal when the temperature detected by any one of the M×N infrared light-receiving elements exceeds a predetermined level having been set beforehand. Then, in response to the interrupt signal, the determination unit 602 can identify the light-receiving element that has detected the temperature exceeding the predetermined setting level by reading information stored in a register. In the present exemplary embodiment, the image forming apparatus 10 uses the above-mentioned interrupt function of the human presence sensor 601 to supply electric power to and start an operation of the determination unit 602. However, the determination unit 602 can be configured to constantly receive electric power and intermittently perform an operation for reading a detection result of the human presence sensor 601 at predetermined time intervals.

FIGS. 7A, 7B, and 7C illustrate differences between detection results obtained by the human presence sensor 601, which reflect the position of a human body in relation to the image forming apparatus 10 according to the first exemplary embodiment.

Each of FIGS. 7A, 7B, and 7C includes an upper part in which the distance between the image forming apparatus 10 and the human body is illustrated and a lower part in which detection results obtained by the infrared ray array sensor are illustrated.

In the present exemplary embodiment, as an example, the human presence sensor 601 is an infrared ray array sensor that is composed of 64 infrared light-receiving elements that are disposed in an 8×8 matrix pattern. More specifically, a group of eight elements 1 to 8 constitutes 8 rows and a group of eight elements "a" to "h" constitute 8 columns. In the following description, the position of each infrared light-receiving element constituting the human presence sensor 601 is designated by any one of element 1a through element 8h.

FIG. 7A indicates a state where the human body has entered the detection area of the human presence sensor 601. In this case, as understood from the detection results of the human presence sensor 601, the heat source is detected at several spots (e.g., elements 1c, 1d, 1e, and 2d) located at a lower part of the detection area. Further, FIG. 7B indicates a state where the human body has approached the image forming apparatus 10. In this case, as understood from the detection results of the human presence sensor 601, the heat source detected area expands upward (from the first row to the second and third rows and further to the fourth and fifth rows) and also expands in the right-and-left direction (from column "d" to columns "c" and "e", and further to columns "b" and "f"). Further, FIG. 7C indicates a state where the human body is positioned so closely to the image forming apparatus 10 (namely, in an apparatus operable area). In this case, as understood from the detection results of the human presence sensor 601, the heat source detected area expands almost entirely in the detection area. The heat source is also detected at the lower part (e.g., the first and second rows) of the detection area.

FIGS. 8A and 8B illustrate differences between detection results obtained by the human presence sensor 601, in a case where a lighting device 50 (e.g., an overhead fluorescent light) is located above the image forming apparatus 10.

When the lighting device 50 is in an OFF state, as illustrated in FIG. 8A, the human presence sensor 601 does not detect any heat source. On the other hand, when the lighting device 50 is in an ON state, as illustrated in FIG. 8B, the human presence sensor 601 detects a heat source (e.g., a fluorescent light) at an upper part of the detection area (e.g., the fifth to eighth rows of the infrared light-receiving elements). As mentioned above, in a case where a heat source placed at a high position (e.g., a lighting device) is detected, the first row element (i.e., the lowermost element) does not detect any heat source. Accordingly, if the area initially detecting a heat source does not include the lower (e.g., first row) element, the image forming apparatus 10 determines that the detected heat source is not a human body and does not perform a determination processing for changing the power supply mode of the image forming apparatus 10.

Figure 9:
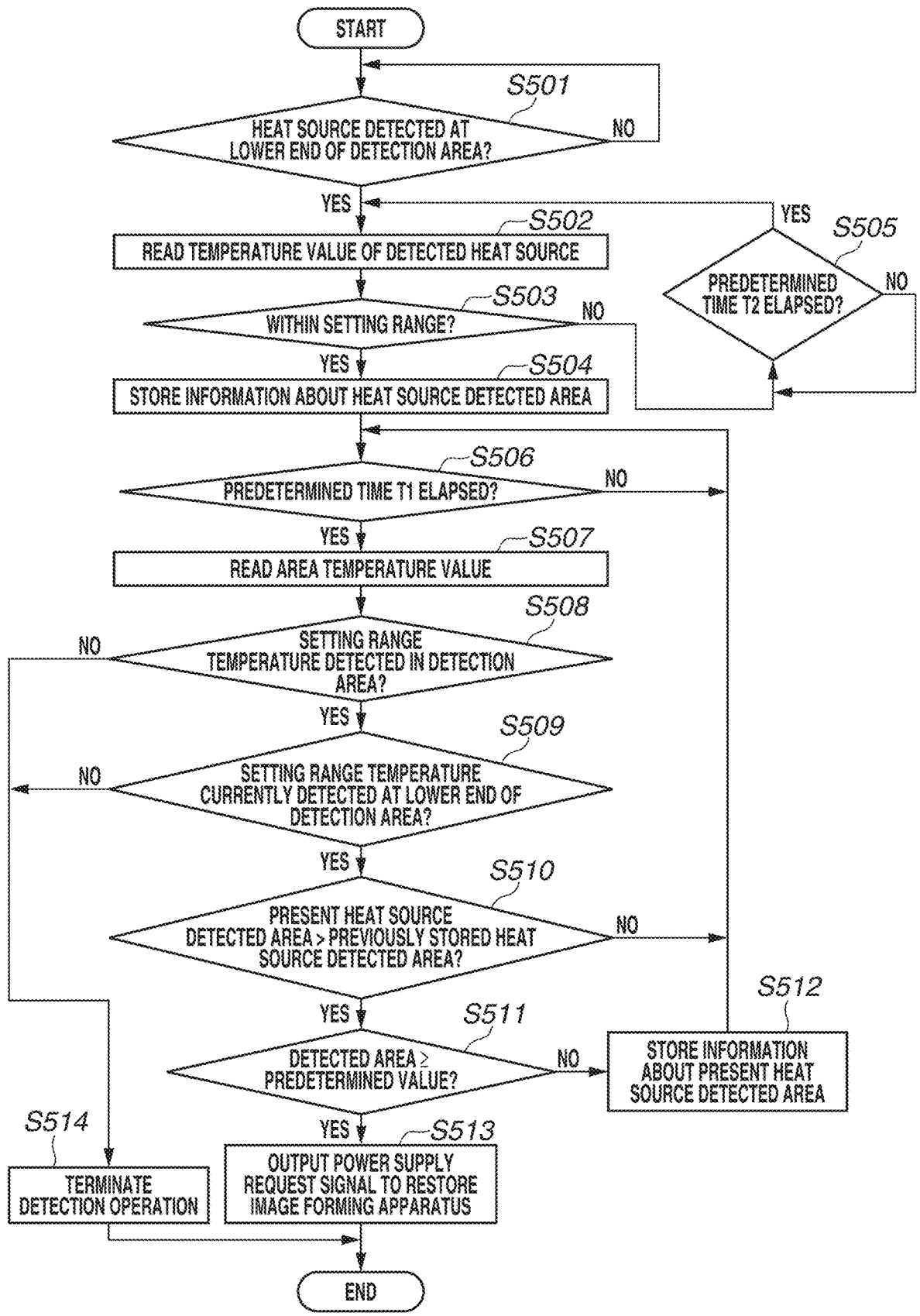
FIG. 9 is a flowchart illustrating an example of determination processing according to a first exemplary embodiment.

FIG. 9 is a flowchart illustrating an example of determination processing that can be performed by the determination unit 602 according to the first exemplary embodiment. To realize the processing of the flowchart illustrated in FIG. 9, the determination unit 602 that is, for example, formed by a processor, executes a program loaded from a storage device (not illustrated), such as the ROM. If the human presence sensor 601 detects a heat source, the human presence sensor 601 outputs an interrupt signal to the determination unit 602. In response to the interrupt signal, the determination unit 602 reads a detection value from each infrared light-receiving element of the human presence sensor 601 and performs the following processing based on the detection values.

First, in step S501, the determination unit 602 determines whether the heat source detected by the human presence sensor 601 has been detected at a lower end of the detection area of the human presence sensor 601. In other words, the determination unit 602 determines whether the lower-end (i.e., the first row) element of the infrared ray sensor array has detected the heat source. If it is determined that there is not any heat source having been detected at the lower end of the detection area of the human presence sensor 601 (namely, when the lower-end element has detected no heat source) (No in step S501), the determination unit 602 determines that there is not any human body having been detected (for example, a non-human body has been detected) and repeats the processing in step S501.

On the other hand, if it is determined that there is a heat source having been detected at the lower end of the detection area of the human presence sensor 601 (namely, when the lower-end element has detected a heat source) (Yes in step S501), then in step S502, the determination unit 602 reads the temperature value of the heat source. Next, in step S503, the determination unit 602 determines whether the temperature value of the heat source having been read in the above-mentioned step S502 is within a predetermined setting range, e.g., from 27° C. to 36° C. The setting range has an approximately 10° C. width considering the fact that ordinary human body temperature is around 36° C.

If it is determined that the temperature value of the heat source is not within the setting range (No in step S503), then in step S505, the determination unit 602 determines whether a predetermined time T2 has elapsed. If the predetermined time T2 has elapsed (Yes in step S505), the operation returns to step S502. Then, in step S502, the determination unit 602 reads the temperature value of the heat source again and determines whether the temperature value is within the setting range.

On the other hand, if it is determined that the temperature value of the heat source is within the setting range (Yes in step S503), the determination unit 602 determines that there is a higher possibility of having detected a human body. Thus, in step S504, the determination unit 602 stores information about an area in which the heat source has been detected (i.e., information about an element that has detected the heat source) as a heat source detected area in a memory of the determination unit 602.

Next, in step S506, the determination unit 602 determines whether a predetermined time T1 has elapsed. If the predetermined time T1 has elapsed (Yes in step S506), then in step S507, the determination unit 602 reads a temperature detection value again in the detection area of the human presence sensor 601. More specifically, the determination unit 602 reads the temperature detection value of each element. In step S508, the determination unit 602 determines whether the above-mentioned setting range temperature has been detected in the detection area of the human presence sensor 601. More specifically, the determination unit 602 determines whether there is any element whose temperature detection value is in the above-mentioned setting range. In this manner, it is feasible to determine whether the heat source stays in the detection area of the human presence sensor 601.

Then, if it is determined that the above-mentioned setting range temperature has not been detected in the detection area of the human presence sensor 601, namely, when there is not any element whose temperature detection value is in the above-mentioned setting range (No in step S508), then in step S514, the determination unit 602 determines that the human body has moved out of the detection area of the human presence sensor 601 and terminates the detection operation. Then, the determination unit 602 terminates the processing of the flowchart illustrated in FIG. 9. When the determination unit 602 terminates the detection operation in step S514, it is useful to bring the determination unit 602 into a dormant state in such a way as to supply no electric power to the determination unit 602.

On the other hand, if it is determined that the above-mentioned setting range temperature has been detected in the detection area of the human presence sensor 601, namely, when there is an element whose temperature detection value is in the above-mentioned setting range (Yes in step S508), then in step S509, the determination unit 602 determines whether the above-mentioned setting range temperature has been detected at the lower part (e.g., the lower end) of the detection area of the human presence sensor 601. More specifically, the determination unit 602 determines whether there is a lower-end (e.g., a first row) element that has detected the above-mentioned setting range temperature. If it is determined that the above-mentioned setting range temperature has not been detected at the lower part of the detection area of the human presence sensor 601, namely, when there is not any lower-end element that has detected the above-mentioned setting range temperature (No in step S509), then in step S514, the determination unit 602 determines that the presently detected heat source is not the human body and terminates the detection operation. Then, the determination unit 602 terminates the processing of the flowchart illustrated in FIG. 9.

On the other hand, if the determination unit 602 determines that the above-mentioned setting range temperature has been detected in the lower part of the detection area of the human presence sensor 601, namely, when there is a lower-end element that has detected the above-mentioned setting range temperature (Yes in step S509), the operation proceeds to step S510. In step S510, the determination unit 602 compares the present heat source detected area (i.e., information about each element having presently detected the heat source) with the heat source detected area previously stored. Then, the determination unit 602 determines whether the present heat source detected area is greater than the previous heat source detected area. Namely, the determination unit 602 determines whether the number of elements having detected the heat source is greater than the previous number.

Then, if the determination unit 602 determines that the present heat source detected area is not greater than the previous heat source detected area, namely, when the number of elements having detected the heat source is not greater than the previous number (No in step S510), the operation returns to step S506.

On the other hand, if the determination unit 602 determines that the present heat source detected area is greater than the previous heat source detected area, namely, when the number of elements having detected the heat source is greater than the previous number (Yes in step S510), the operation proceeds to step S511. In step S511, the determination unit 602 determines whether the present heat source detected area is equal to or greater than a predetermined area having been set beforehand. Namely, the determination unit 602 determines whether the number of elements having detected the heat source is equal to or greater than a predetermined value.

If it is determined that the present heat source detected area is less than the predetermined area having been set beforehand, namely, when the number of elements having detected the heat source is less than the predetermined value (No in step S511), then in step S512, the determination unit 602 stores information about the present heat source detected area (i.e., information about each element having detected the heat source). Subsequently, the operation proceeds to step S506.

On the other hand, if it is determined that the present heat source detected area is equal to or greater than the area having been set beforehand, namely, when the number of elements having detected the heat source is equal to or greater than the predetermined value (Yes in step S511), the determination unit 602 determines that the human body has approached within a predetermined distance from the image forming apparatus 10. The operation proceeds to step S513. In step S513, the determination unit 602 causes the human body detection sensor unit 310 to output the power supply request signal (i.e., the signal Q illustrated in FIG. 2) to the power source control unit 401 so that the image forming apparatus 10 can change the power state thereof.

Although the determination unit 602 checks whether the present heat source detected area is equal to or greater than the area having been set beforehand in step S511 illustrated in FIG. 5, the determination unit 602 can be configured to determine whether an occupation rate of the heat source detected area in the detection area of the human presence sensor 601 (i.e., a ratio of elements having detected heat source to all elements) is equal to or greater than a predetermined level having been set beforehand.

Further, if the number of loop processes to be performed when the determination result in step S510 or step S511 is "No" reaches a predetermined number, it is useful to increase the T1 value so that the determination unit 602 can perform the above-mentioned area temperature reading operations at increased time intervals. Such a modification is effective in reducing the electric power consumption. Further, the determination unit 602 can be configured to terminate the above-mentioned detection operation if the number of loop processes reaches a predetermined level.

As mentioned above, the determination unit 602 according to the first exemplary embodiment instructs the image forming apparatus 10 in such a way as to shift from the power saving state to the ordinary operation power state with reference to the number of elements constituting the human presence sensor 601 that have detected the predetermined temperature or above. More specifically, the determination unit 602 can detect the temperature of an approaching person with only one human presence sensor 601 and can determine whether the detected person intends to operate the image forming apparatus 10 by checking if the heat source detected area becomes greater. In other words, the first exemplary embodiment can realize an image forming apparatus capable of not only improving user friendliness but also accurately detecting an approaching human body even in the power saving mode (i.e., in a state where lesser electric power is consumed). Further, when the human presence sensor 601 is installed on the image forming apparatus 10, it is useful to set the human presence sensor 601 to face an obliquely upward direction from the front side of the image forming apparatus 10 because erroneously detecting any other object (e.g., the external apparatus 20 or the PC/monitor 30 placed in front of the image forming apparatus 10 or a person sitting on a desk) can be prevented.

Hereinafter, a second exemplary embodiment will be described in detail. The second exemplary embodiment is different from the above-mentioned first exemplary embodiment in that a different determination processing method is used. However, the configuration of the image forming apparatus 10 and the layout of the human presence sensor are similar to those described in the first exemplary embodiment and therefore redundant description thereof will be avoided.

FIGS. 10A to 10C illustrate differences between detection results obtained by the human presence sensor, which reflect the position of a human body in relation to the image forming apparatus 10 according to the second exemplary embodiment. As a view common to all cases, the positional relationship (i.e., distance) between the image forming apparatus 10 and a human body seen from one side is illustrated at an upper part of the drawing.

In each of FIGS. 10A to 10C, the positional relationship (i.e., distance) between the image forming apparatus 10 and the human body seen from the top is illustrated at a middle part of the drawing. Further, detection results obtained by the infrared ray array sensor at respective positions are illustrated at a lower part of the drawing.

FIG. 10A illustrates a case where the human body is approaching the image forming apparatus 10 from the front thereof. FIG. 10B illustrates a case where the human body is approaching the image forming apparatus 10 from the left thereof. FIG. 10C illustrates a case where the human body is approaching the image forming apparatus 10 from the right thereof.

In the second exemplary embodiment, similar to the first exemplary embodiment, an infrared ray array sensor serving as the human presence sensor 601 is attached in such a way as to face an obliquely upward direction from the front surface of the image forming apparatus 10. Therefore, when a human object is approaching the image forming apparatus 10, several infrared light-receiving elements belonging to the lower-end row of the detection area of the human presence sensor 601 can detect a part of the approaching human body (e.g., a head or a chest). Therefore, as common features, it is understood that the timing at which the image forming apparatus 10 should be returned from the power saving mode can be detected when the upper end of the heat source (corresponding to the human head) is positioned at the sixth row of the infrared ray array sensor (indicated by a dotted line in the lower part of FIGS. 10A to 10C) irrespective of the approaching direction of the human body. Using the above-mentioned characteristic features, the image forming apparatus according to the second exemplary embodiment performs determination processing for changing the power supply mode according to a flowchart illustrated in FIG. 11.

Figure 11:
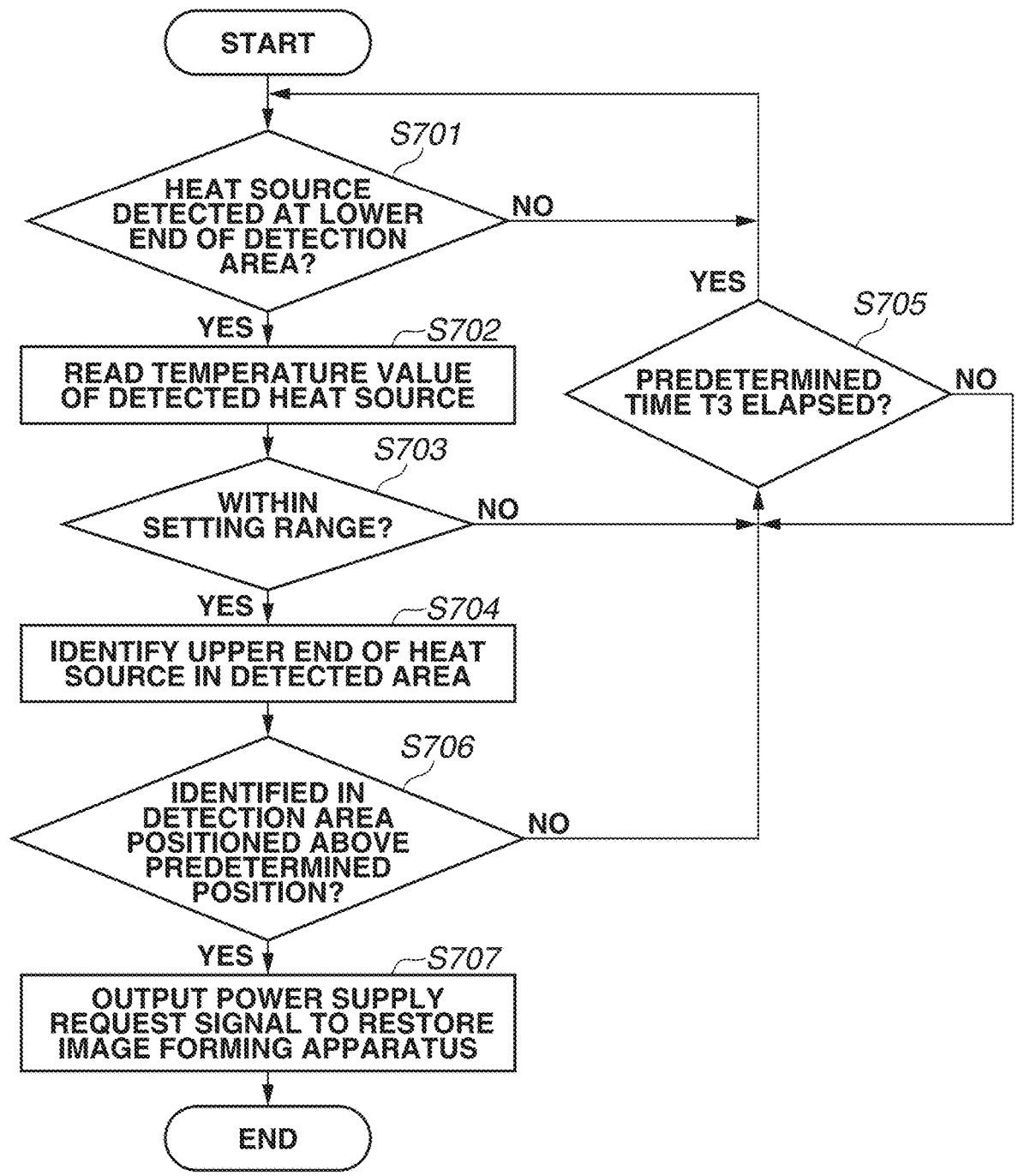
FIG. 11 is a flowchart illustrating an example of determination processing according to a second exemplary embodiment.

FIG. 11 is a flowchart illustrating an example of determination processing that can be performed by the determination unit 602 according to the second exemplary embodiment. To realize the processing of the flowchart illustrated in FIG. 11, the determination unit 602 that is, for example, formed by a processor, executes a program loaded from a storage device (not illustrated), such as the ROM. If the human presence sensor 601 detects a heat source, the human presence sensor 601 outputs an interrupt signal to the determination unit 602. In response to the interrupt signal, the determination unit 602 reads a detection value from each infrared light-receiving element of the human presence sensor 601 and performs the following processing based on the detection values.

First, in step S701, the determination unit 602 determines whether the heat source detected by the human presence sensor 601 has been detected at the lower end of the detection area of the human presence sensor 601. In other words, the determination unit 602 determines whether the lower end (i.e., the first row) element of the infrared ray sensor array has detected the heat source. If it is determined that there is not any heat source having been detected at the lower end of the detection area of the human presence sensor 601 (namely, when the lower-end element has detected no heat source (No in step S701), the determination unit 602 determines that there is not any human body having been detected (for example a non-human body has been detected) and repeats the processing in step S701.

On the other hand, if it is determined that there is a heat source having been detected at the lower end of the detection area of the human presence sensor 601 (namely, when the lower-end element has detected a heat source) (Yes in step S701), then in step S702, the determination unit 602 reads the temperature value of the heat source. Next, in step S703, the determination unit 602 determines whether the temperature value of the heat source having been read in the above-mentioned step S702 is within a predetermined setting range, e.g., from 27° C. to 36° C. The setting range has an approximately 10° C. width considering the fact that ordinary human body temperature is around 36° C.

If it is determined that the temperature value of the heat source is not within the setting range (No in step S703), then in step S705, the determination unit 602 determines whether a predetermined time T3 has elapsed. If the predetermined time T3 has elapsed (Yes in step S705), the operation returns to step S701. Then, the determination unit 602 reads the temperature value of the heat source again and determines whether the temperature value is within the setting range.

On the other hand, if it is determined that the temperature value of the heat source is within the setting range (Yes in step S703), the determination unit 602 determines that there is a higher possibility of having detected a human body. Then, in step S704, the determination unit 602 identifies an upper-end of heat source position in the heat source detected area (i.e., the uppermost element that has detected the heat source).

Next, in step S706, the determination unit 602 determines whether the above-mentioned upper end of the heat source identified in step S704 is in an area having been set beforehand (e.g., the sixth to eighth rows), which is positioned above the fifth row of the human presence sensor 601. More specifically, the determination unit 602 determines whether the uppermost element having detected the heat source is positioned above the fifth row. Then, if the determination unit 602 determines that the above-mentioned upper end of the heat source identified in step S704 is not included in the area having been set beforehand (e.g., the sixth to eighth rows), which is positioned above the fifth row, namely when the uppermost element having detected the heat source is not positioned above the fifth row (No in step S706), the operation proceeds to step S705.

On the other hand, if it is determined that the above-mentioned upper end of the heat source identified in step S704 is in the area having been set beforehand (e.g., the sixth to eighth rows), which is positioned above the fifth row, namely, when the uppermost element having detected the heat source is positioned above the fifth row (Yes in step S706), the determination unit 602 determines that the human body has approached within the predetermined distance from the image forming apparatus 10. Subsequently, the operation proceeds to step S707. In step S707, the determination unit 602 causes the human body detection sensor unit 310 to output the power supply request signal (i.e., the signal Q illustrated in FIG. 2) to the power source control unit 401 so that the image forming apparatus 10 can change the power state thereof.

If the number of loop processes to be performed when the determination result in step S703 or step S706 is "No" reaches a predetermined number, it is useful to increase the T3 value so that the determination unit 602 can perform the above-mentioned area temperature reading operations at increased time intervals. Such a modification is effective in reducing the electric power consumption. Further, the determination unit 602 can be configured to terminate the above-mentioned detection operation if the number of loop processes reaches a predetermined level.

As mentioned above, the image forming apparatus according to the second exemplary embodiment is configured to switch the power supply mode to the ordinary operation power mode when the determination unit 602 determines that an object (i.e., heat source) detection area expands from the lower end toward the upper end of the detection area of the human presence sensor 601 in such a way as to reach a specific area (e.g., the area including the sixth row and the above). The second exemplary embodiment characterized by the above-mentioned configuration brings effects of preventing erroneous determination of a user and adequately performing an electric power control for the image forming apparatus irrespective of the approaching direction of the human body, in addition to the effects described in the first exemplary embodiment.

Hereinafter, a third exemplary embodiment will be described in detail. The third exemplary embodiment is different from the first and second exemplary embodiments in that a different determination processing method is used. However, the configuration of the image forming apparatus 10 and the layout of the human presence sensor are similar to those described in the first and second exemplary embodiments and therefore redundant description thereof will be avoided.

When the human body approaches the image forming apparatus 10 as illustrated in FIG. 7A to (7), a heat source area to be detected in a second frame will expand compared to the heat source area initially detected by the human presence sensor 601 and a heat source area to be detected in the third frame will further expand.

On the other hand, when the lighting device 50 such as ceiling lighting is turned on as illustrated in FIG. 8B, a heat source area to be detected in a frame will not cause any substantial change compared to the heat source area initially detected by the human presence sensor 601. More specifically, it is feasible to determine that the human body is approaching the image forming apparatus 10 if the heat source detected area substantially expands in subsequent frames. Further, there will be a case where a person who has approached the image forming apparatus 10 may pass by without stopping at the image forming apparatus 10. To the contrary, a person who intends to use the image forming apparatus 10 stays at the image forming apparatus and starts operating the image forming apparatus 10. Accordingly, it is feasible to determine that the human body stays in front of the image forming apparatus 10 if the heat source having an enlarged detection area is continuously detected after a predetermined time has elapsed. Using the above-mentioned characteristic features, the image forming apparatus 10 according to the third exemplary embodiment performs determination processing for changing the power supply mode according to a flowchart illustrated in FIG. 12.

Figure 12:
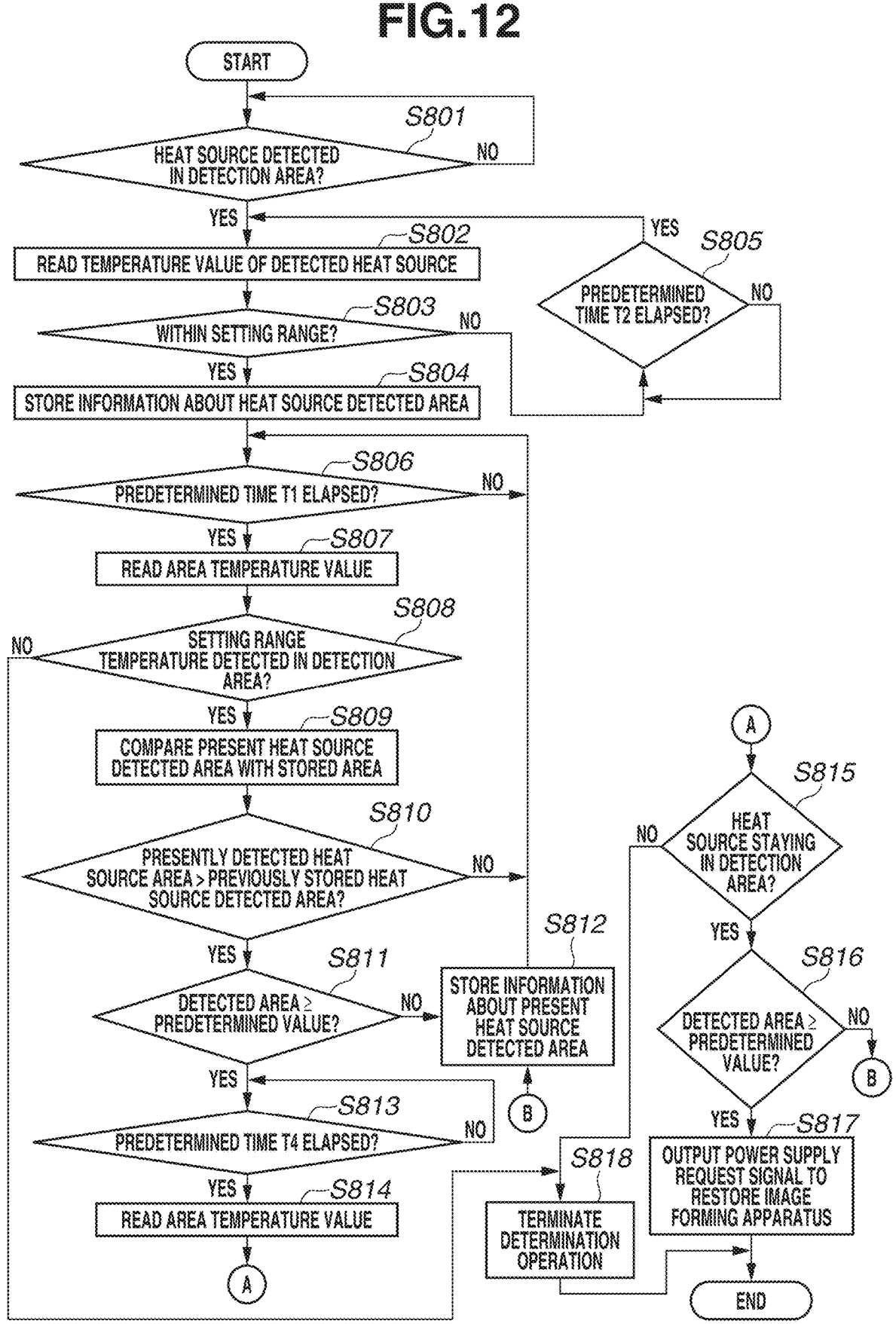
FIG. 12 is a flowchart illustrating an example of determination processing according to a third exemplary embodiment.

FIG. 12 is a flowchart illustrating an example of determination processing that can be performed by the determination unit 602 according to the third exemplary embodiment. To realize the processing of the flowchart illustrated in FIG. 12, the determination unit 602 that is, for example, formed by a processor, executes a program loaded from a storage device (not illustrated), such as the ROM. If the human presence sensor 601 detects a heat source, the human presence sensor 601 outputs an interrupt signal to the determination unit 602. In response to the interrupt signal, the determination unit 602 reads a detection value from each infrared light-receiving element of the human presence sensor 601 and performs the following processing based on the detection values.

First, in step S801, the determination unit 602 determines whether the heat source has been detected in the detection area of the human presence sensor 601. Namely, the determination unit 602 determines whether there is any element that has detected the heat source. If it is determined that the heat source has been detected in the detection area of the human presence sensor 601 (Yes in step S801), the determination unit 602 performs processing in step S802 and subsequent steps. In the present exemplary embodiment, processing to be performed in steps S802 through S808 is similar to the processing performed in steps S502 through S508 illustrated in FIG. 9 and therefore redundant description thereof will be avoided.

If it is determined that the above-mentioned setting range temperature has not been detected in the detection area of the human presence sensor 601, namely, when there is not any element whose temperature detection value is within the above-mentioned setting range (No in step S808), then in step S818, the determination unit 602 determines that the human body has moved out of the detection area of the human presence sensor 601 and terminates the determination operation. Then, the determination unit 602 terminates the processing of the flowchart illustrated in FIG. 12. When the determination unit 602 terminates the determination operation in step S818, it is useful to bring the determination unit 602 into a dormant state in such a way as to supply no electric power to the determination unit 602.

On the other hand, if the determination unit 602 determines that the above-mentioned setting range temperature has been detected in the above-mentioned detection area, namely, when there is an element whose temperature detection value is in the above-mentioned setting range (Yes in step S808), the operation proceeds to step S809. In step S809, the determination unit 602 compares the present heat source detected area (i.e., information about each element having presently detected the heat source) with the previously stored heat source detected area (i.e., information about each element having previously detected the heat source). In step S810, the determination unit 602 determines whether the present heat source detected area is greater than the previously stored heat source detected area. Namely, the determination unit 602 determines whether the number of elements having presently detected the heat source is greater than the number of elements having previously detected the heat source.

If it is determined that the present heat source detected area is not greater than the previously stored heat source detected area, namely, when the number of elements having presently detected the heat source is not greater than the number of elements having previously detected the heat source (No in step S810), the determination unit 602 determines that the human body is not going to operate the image forming apparatus 10. Thus, the operation returns to step S806 to continue the above-mentioned determination processing.

On the other hand, if it is determined that the present heat source detected area is greater than the previously stored heat source detected area, namely, when the number of elements having presently detected the heat source is greater than the number of elements having previously detected the heat source (Yes in step S810), the determination unit 602 determines that the human body is going to operate the image forming apparatus 10. Subsequently, the operation proceeds to step S811.

In step S811, the determination unit 602 determines whether the occupation area of the presently detected heat source is equal to or greater than a predetermined area having been set beforehand. More specifically, the determination unit 602 determines whether the number of elements having detected the heat source is equal to or greater than a predetermined number. If it is determined that the occupation area of the presently detected heat source is less than the predetermined area having been set beforehand, namely, when the number of elements having detected the heat source is less than the predetermined number (No in step S811), then in step S812, the determination unit 602 stores information about the present heat source detected area (i.e., information about each element having detected the heat source). Subsequently, the operation returns to step S806 to continue the above-mentioned processing.

On the other hand, if the determination unit 602 determines that the occupation area of the presently detected heat source is equal to or greater than the area having been set beforehand, namely, when the number of elements having detected the heat source is equal to or greater than the predetermined number (Yes in step S811), the operation proceeds to step S813. In step S813, the determination unit 602 determines whether a predetermined time T4 has elapsed. If the predetermined time T4 has elapsed (Yes in step S813), then in step S814, the determination unit 602 reads the temperature detection value again in the detection area of the human presence sensor 601 (i.e., the temperature detection value of each sensor). Subsequently, in step S815, the determination unit 602 determines whether the heat source stays in the detection area of the human presence sensor 601.

If it is determined that there is not any heat source that stays in the detection area of the human presence sensor 601 (No in step S815), then in step S818, the determination unit 602 determines that the human body has moved out of the detection area of the human presence sensor 601 and terminates the determination operation. Then, the determination unit 602 terminates the processing of the flowchart illustrated in FIG. 12.

On the other hand, if the determination unit 602 determines that the heat source stays in the detection area of the human presence sensor 601 (Yes in step S815), the operation proceeds to step S816. In step S816, the determination unit 602 determines whether the occupation area of the presently detected heat source is equal to or greater than an area having been set beforehand (namely whether the number of elements having detected the heat source is equal to or greater than a number having been set beforehand). Then, if it is determined that the occupation area of the presently detected heat source is smaller than the area having been set beforehand, namely, when the number of elements having detected the heat source is less than the number having been set beforehand (No in step S816), then in step S812, the determination unit 602 stores information about the present heat source detected area. Subsequently, the operation returns to step S806 to continue the above-mentioned determination processing.

On the other hand, if it is determined that the occupation area of the presently detected heat source is equal to or greater than the area having been set beforehand, namely, when the number of elements having detected the heat source is equal to or greater than the number having been set beforehand (Yes in step S816), the determination unit 602 determines that the human body stays within the predetermined distance from the image forming apparatus 10. Subsequently, the operation proceeds to step S817. In step S817, the determination unit 602 causes the human body detection sensor unit 310 to output the power supply request signal (i.e., the signal Q illustrated in FIG. 2) to the power source control unit 401 so that the image forming apparatus 10 can change the power state thereof.

If the number of loop processes to be performed when the determination result in step S810, step S811, or step S816 is "No" reaches a predetermined number, it is useful to increase the T1 value so that the determination unit 602 can perform the above-mentioned area temperature reading operations at increased time intervals. Such a modification is effective in reducing the electric power consumption. Further, the determination unit 602 can be configured to terminate the above-mentioned detection operation if the number of loop processes reaches a predetermined level.

As mentioned above, the third exemplary embodiment brings effects of preventing erroneous determination of a user and adequately performing an electric power control for the image forming apparatus irrespective of the approaching direction of the human body. For example, according to the third exemplary embodiment, it is feasible to prevent a person who passes by the image forming apparatus from being erroneously determined as a user of the image forming apparatus.

The apparatus configurations described in the first and third exemplary embodiments are characterized by identifying a user who is approaching the image forming apparatus by checking whether the heat source detected area is expanding. Further, the apparatus configuration described in the second exemplary embodiment is characterized by identifying a user who is approaching the image forming apparatus by checking whether the upper end of the heat source detected area is equal to or greater than the predetermined area having been set beforehand. However, as another exemplary embodiment, it is useful to refer to an enlargement rate of the heat source detected area per unit time or a rising rate of the heat source detection row of the array sensor per unit time, in identifying a user who is approaching the image forming apparatus.

Next, a fourth exemplary embodiment will be described in detail. In the above-mentioned first to third exemplary embodiments, the employed human presence sensor 601 is the infrared ray array sensor. However, the above-mentioned infrared ray array sensor can be replaced by a camera. In this case, the image forming apparatus obtains an image of a human body captured by the camera (i.e., the human presence sensor) and identifies a distribution of human body detected area in the imaged area, similar to the above-mentioned case using the infrared ray array sensor. Further, similar to the above-mentioned case using the infrared ray array sensor, the image forming apparatus detects a part of the human body at a lower end of an image captured by the camera installed on the image forming apparatus 10 and obtains an occupation rate of a human body imaged area in the captured image or height information about a human head detected part (i.e., the row number of the sensor array). Then, the image forming apparatus changes the power supply mode of the image forming apparatus 10 with reference to the obtained information. In this case, the method for installing the human presence sensor described in the first to third exemplary embodiments can be employed similarly when the camera is installed on the image forming apparatus.

Further, in the fourth exemplary embodiment, the image forming apparatus cancels the power saving mode if any image corresponding to a part of the human body is included in the captured image. Further, the image forming apparatus terminates the determination processing to be performed by the determination unit 602 when the captured image does not include any human body imaged area.

As mentioned above, the fourth exemplary embodiment brings effects of preventing erroneous detection of a person approaching the image forming apparatus and adequately performing an electric power control for the image forming apparatus even in a case where an easily available camera is employed as the human presence sensor.

As mentioned above, the image forming apparatus can accurately determine whether a person who is approaching the image forming apparatus is a true user who intends to operate the image forming apparatus or a mere pedestrian, with only one human presence sensor, at an appropriate position and can switch the power state of the apparatus.

An embodiment can eliminate disadvantages of a conventional configuration characterized by cancelling the power saving mode after a person who has approached and stopped at the image forming apparatus is detected. More specifically, an embodiment can improve the user friendliness by realizing processing for determining whether an approaching person intends to operate the image forming apparatus before the person stops at the apparatus. Further, the embodiment can suppress the product costs by realizing the apparatus using only one human presence sensor and makes it feasible to detect the user even in the power saving mode (i.e., in the state where lesser electric power is consumed). Further, one embodiment can suppress error detection and can reduce useless electric power consumption caused by erroneous restoration of the apparatus.

The disclosure is not limited to the image forming apparatus and can be applied to any other electronic device that is capable of performing operations while switching the power state between a plurality of modes.

As mentioned above, an embodiment can accurately determine a user who has approached the apparatus in the power saving mode (i.e., in the state where lesser electric power is consumed) and can switch the power state of the apparatus at appropriate timing. As a result, it becomes feasible to reduce the standby time for each user and improve the user friendliness. The product costs can be reduced.

The configuration and contents of the above-mentioned various data are not limited to the above-mentioned examples and can be modified in various ways considering an application and purposes.

The disclosure can be embodied, for example, as a system, an apparatus, a method, a program, or a storage medium, despite of the disclosure of the above-mentioned some exemplary embodiments. More specifically, the disclosure is applicable to a system including a plurality of devices or applicable to an apparatus formed by a single device. Further, the disclosure encompasses every possible combination of the above-mentioned exemplary embodiments.

(Other Exemplary Embodiments)

Further, an embodiment can be realized by executing the following processing. More specifically, the processing includes supplying a software program capable of realizing the functions of the above-mentioned exemplary embodiments to a system or an apparatus via a network or an appropriate storage medium and causing a computer (or CPU or a micro-processing unit (MPU)) of the system or the apparatus to read and execute the program.

Further, an embodiment can be applied to a system including a plurality of devices or an apparatus formed by a single device.

The disclosure is not limited to the above-mentioned exemplary embodiments. The disclosure can be modified in various ways within the scope thereof. In this case, the possible modification includes any useful combination of two or more exemplary embodiments. The disclosure does not intend to exclude such modification. More specifically, the disclosure encompasses every possible configuration obtainable by combining the above-mentioned exemplary embodiments and their deformations.

The image forming apparatus can accurately identify a user who has approached the image forming apparatus in the power saving state (i.e., in a state where lesser electric power is consumed) and can switch the power state of the image forming apparatus at appropriate timing. As a result, it becomes feasible to reduce the standby time for each user and improve the user friendliness. The product costs can be reduced.

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus at least having a first power state and a second power state different from the first power state, the image forming apparatus comprising:
   a sensor having a plurality of elements which output a value corresponding to an input to the element; and
   a controller which shifts a power state of the image forming apparatus to the first power state from the second power state based on number of a plurality of elements outputting a value that is greater than a predetermined value and satisfying a predetermined condition, regardless of a form formed by the plurality of elements outputting a value that is greater than a predetermined value and satisfying a predetermined condition.

2. The image forming apparatus according to claim 1, wherein the sensor is disposed in such a way as to face an obliquely upward direction.

3. The image forming apparatus according to claim 2, wherein the controller shifts the power state of the image forming apparatus to the first power state from the second power state in a case where (a) the number of the plurality of elements outputting a value that is greater than the predetermined value is larger than predetermined number and (b) the number of the plurality of elements outputting a value that is greater than the predetermined value is larger than previous number of the plurality of elements outputting a value that is greater than the predetermined value.

4. The image forming apparatus according to claim 1, wherein the each of the plurality of elements is an infrared ray receiving element.

5. The image forming apparatus according to claim 1, wherein the controller has a CPU,
   wherein, in the second power state, electric power supply to the CPU is stopped and, in the first power state, electric power is supplied to the CPU.

6. The image forming apparatus according to claim 1, further comprising a display,
   wherein, in the second power state, the display is not lighted up and, in the first power state, the display is lighted up.

7. The image forming apparatus according to claim 1, further comprising a printing unit.

8. The image forming apparatus according to claim 1, wherein the plurality of elements is arranged in a reticular pattern.

9. The image forming apparatus according to claim 1, wherein the controller shifts the power state of the image forming apparatus to the first power state from the second power state in a case where the number of the plurality of elements outputting a value that is greater than the predetermined value and satisfying the predetermined condition is larger than predetermined number thereof.

10. A method for controlling an image forming apparatus which at least has a first power state and a second power state different from the first power state and includes a sensor including a plurality of elements, the method comprising:
    receiving a plurality of values output from the plurality of elements;
    and
    shifting a power state of the image forming apparatus to the first power state from the second power state based on number of a plurality of elements outputting a value that is greater than a predetermined value and satisfying a predetermined condition, regardless of a form formed by the plurality of elements outputting the value that is greater than the predetermined value and satisfying the predetermined condition.

11. An image forming apparatus at least having a first power state and a second power state different from the first power state, the image forming apparatus comprising:

a sensor having a plurality of elements which output a value corresponding to an input to the element; and a controller which shifts a power state of the image forming apparatus to the first power state from the second power state based on number of a plurality of elements outputting a value that is greater than a predetermined value and corresponding to a target object, regardless of a form formed by the plurality of elements outputting the value that is greater than the predetermined value and corresponding to the target object.

12. The image forming apparatus according to claim 11, wherein the sensor is disposed in such a way as to face an obliquely upward direction.

13. The image forming apparatus according to claim 12, wherein the controller shifts the power state of the image forming apparatus to the first power state from the second power state in a case where (a) the number of the plurality of elements outputting a value that is greater than the predetermined value is larger than predetermined number and (b) the number of the plurality of elements outputting a value that is greater than the predetermined value is larger than previous number of the plurality of elements outputting a value that is greater than the predetermined value.

14. The image forming apparatus according to claim 11, wherein the each of the plurality of elements is an infrared ray receiving element.

15. The image forming apparatus according to claim 11, wherein the controller has a CPU,
wherein, in the second power state, electric power supply to the CPU is stopped and, in the first power state, electric power is supplied to the CPU.

16. The image forming apparatus according to claim 11, further comprising a display,
wherein, in the second power state, the display is not lighted up and, in the first power state, the display is lighted up.

17. The image forming apparatus according to claim 11, further comprising a printing unit.

18. The image forming apparatus according to claim 11, wherein the plurality of elements is arranged in a reticular pattern.

19. The image forming apparatus according to claim 11, wherein the controller shifts the power state of the image forming apparatus to the first power state from the second power state in a case where the number of the plurality of elements outputting a value that is greater than the predetermined value and corresponding to the target object is larger than predetermined number thereof.

* * * * *